US009935988B2

(12) United States Patent
Shibata

(10) Patent No.: US 9,935,988 B2
(45) Date of Patent: Apr. 3, 2018

(54) INFORMATION PROCESSING DEVICE AND INFORMATION PROCESSING METHOD

(71) Applicant: KYOCERA Document Solutions Inc., Osaka (JP)

(72) Inventor: Yukihiro Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 275 days.

(21) Appl. No.: 14/725,707

(22) Filed: May 29, 2015

(65) Prior Publication Data
US 2015/0350269 A1 Dec. 3, 2015

(30) Foreign Application Priority Data

May 29, 2014 (JP) ................. 2014-111551

(51) Int. Cl.
G06F 17/00 (2006.01)
H04L 29/06 (2006.01)
H04L 29/08 (2006.01)
G06F 3/0483 (2013.01)
H04L 12/58 (2006.01)
H04L 12/18 (2006.01)

(52) U.S. Cl.
CPC .......... *H04L 65/403* (2013.01); *G06F 3/0483* (2013.01); *H04L 12/1827* (2013.01); *H04L 51/046* (2013.01); *H04L 67/02* (2013.01)

(58) Field of Classification Search
None
See application file for complete search history.

(56) References Cited

U.S. PATENT DOCUMENTS

2003/0182375 A1* 9/2003 Zhu ................. G06F 17/24 709/205
2004/0030697 A1* 2/2004 Cochran .......... G06F 17/30861
(Continued)

FOREIGN PATENT DOCUMENTS

JP 2004-252632 A 9/2004
JP 2010-146116 A 7/2010
JP 2011-081639 A 4/2011
(Continued)

*Primary Examiner* — Stephen Hong
*Assistant Examiner* — Shahid Khan
(74) *Attorney, Agent, or Firm* — Hawaii Patent Services; Nathaniel K. Fedde; Kenton N. Fedde

(57) ABSTRACT

To provide an information processing device that facilitates an audience to transmit information thereto. This information processing device is configured to include a memory part having an audience area and to be connected with first (presenter side) and second (audience side) terminals. The audience area records a various kinds of information including a presentation material of plural page numbers. The device operates to (1) read out only a character string added with a page number selected by the second terminal from the memory part and causes the second terminal to output the resulting string, (2) record additionally an information combination on an audience writing area which is formed of a character string entered from the second terminal, the selected page number, and a terminal ID, and (3) cause the first terminal to read out the information combination added with the selected page number and to output the resulting information combination.

2 Claims, 29 Drawing Sheets

(56) References Cited

U.S. PATENT DOCUMENTS

2006/0236246 A1* 10/2006 Bono ................... G09B 5/00
                                                        715/730
2012/0237918 A1    9/2012  Kaida

FOREIGN PATENT DOCUMENTS

| JP | 2011-238178 A | 11/2011 |
|----|---------------|---------|
| JP | 2012-212419 A | 11/2012 |
| JP | 2013-254275 A | 12/2013 |

* cited by examiner

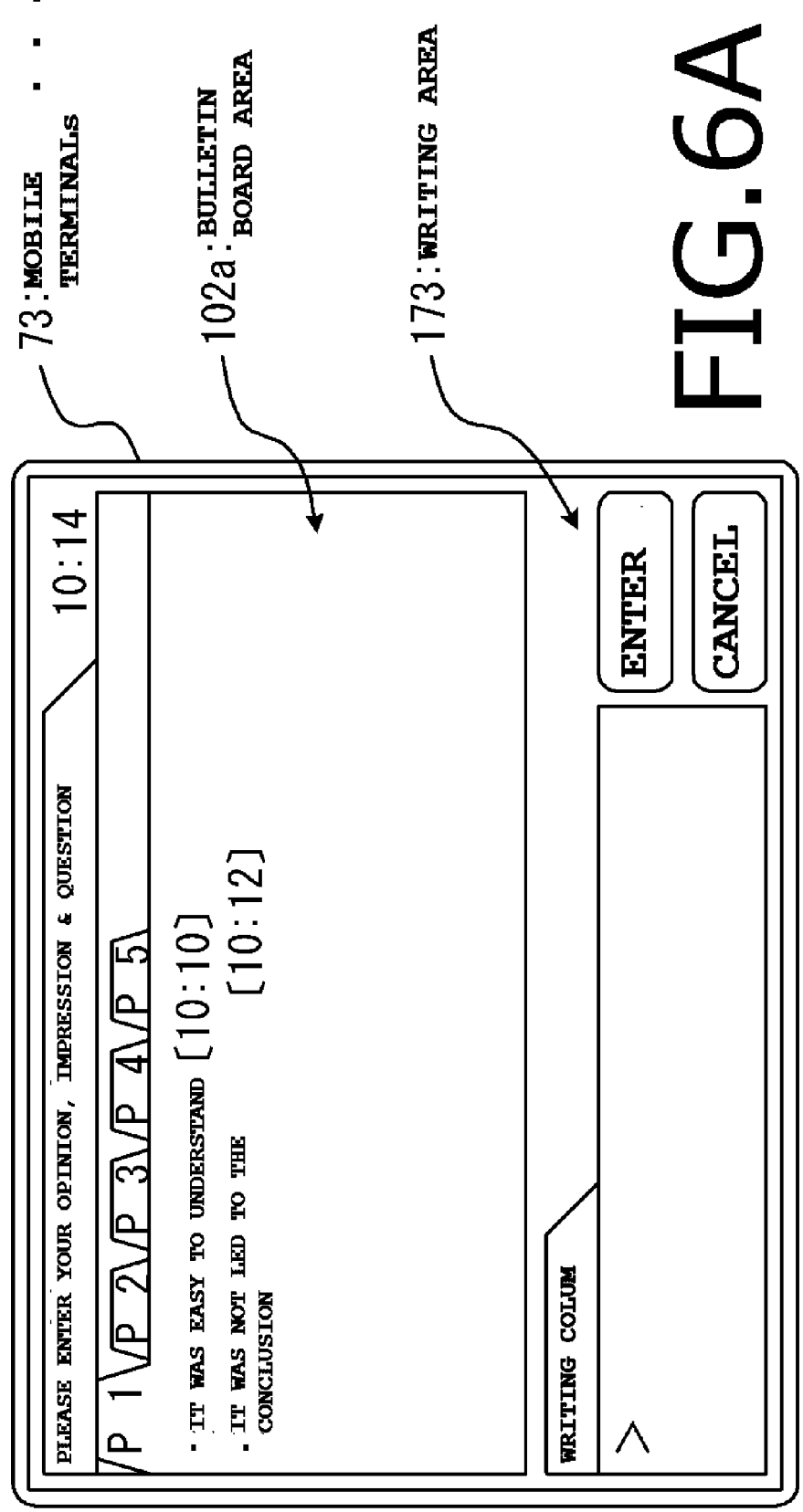

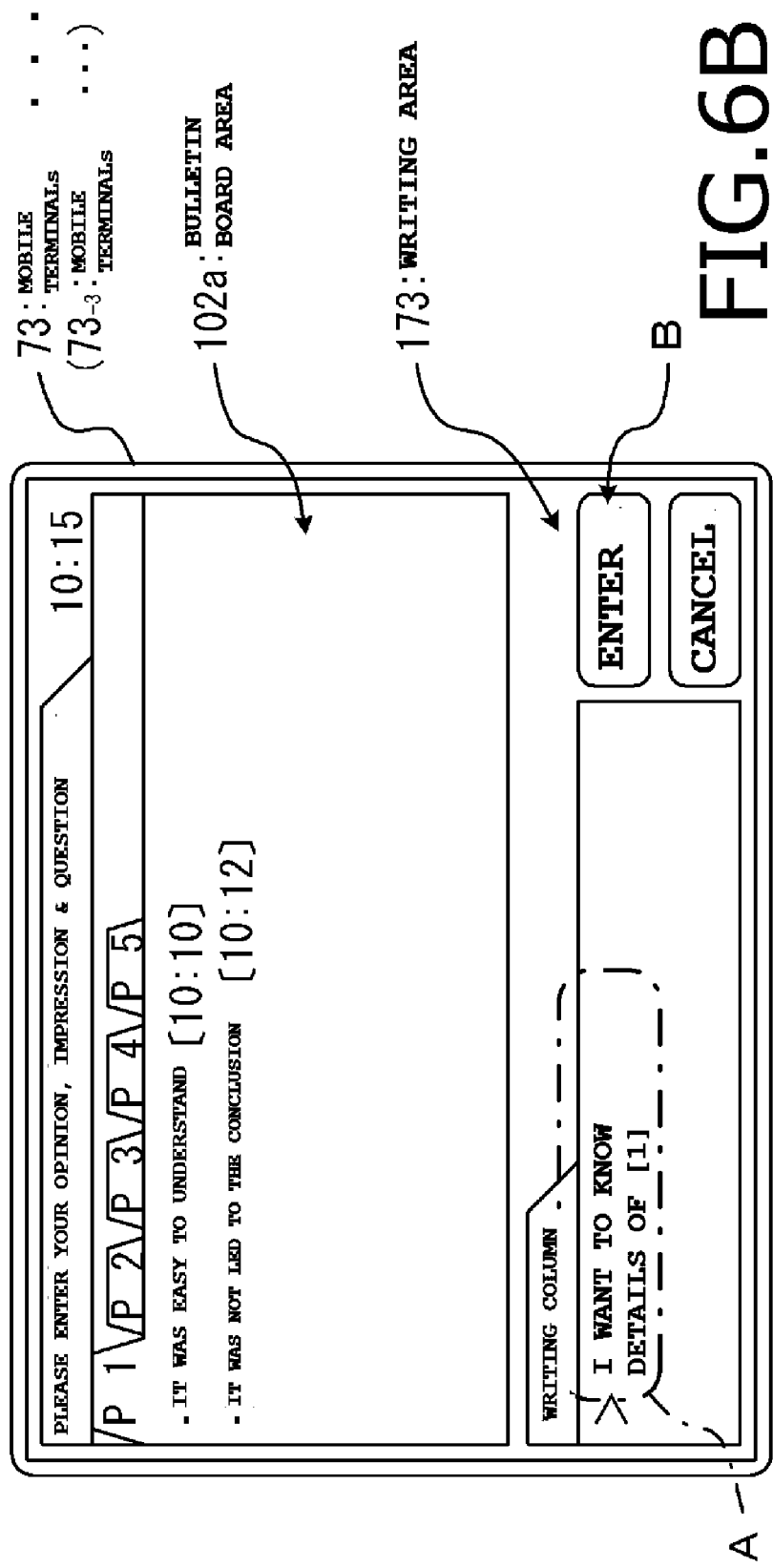

| LOGICAL ADDRESS (AREA) | 12: MEMORY |
|---|---|
| | DATA (CONTENT) |
| x000 ⋮ x009 | PROGRAM AREA |
| x010 ⋮ x019 | VARIOUS SETTING INFORMATION AREA |
| x020 ⋮ x029 | PRESENTER WRITING AREA<br>IMAGE DATA AREA | x030 — PRESENTATION MATERIAL AREA:

| | | | | | |
|---|---|---|---|---|---|
| PRESENTATION No. #1 | Page No."P1" | [1]◇◇◇ ··· | [2]△△△ | | PRESENTER WRITING AREA |
| | No."P2" | [4]◆◆◆ ··· | [5]▽▽▽ | | PRESENTER WRITING AREA |
| | No."P3" | : | | | PRESENTER WRITING AREA |
| | : | | | | PRESENTER WRITING AREA |
| PRESENTATION No. #2 | Page No."P1" | | | | PRESENTER WRITING AREA | x039

AUDIENCE WRITING AREA (x040 – x049):

| WRITE TIME INSTANT | TERMINAL ID | PRESENTATION No. # | Page No."P1" | COMMENT (CHARACTER STRING) |
|---|---|---|---|---|
| 10:05 | User1 | PRESENTATION No. #1 | Page No."P1" | I WANT TO KNOW FOLL·· |
| 10:06 | User2 | PRESENTATION No. #1 | Page No."P1" | I WANT TO KNOW THIS ·· |
| 10:10 | User3 | PRESENTATION No. #1 | Page No."P1" | IT WAS EASY TO |
| 10:12 | User3 | PRESENTATION No. #1 | Page No."P1" | IT WAS NOT LED TO ·· |
| 10:15 | User3 | PRESENTATION No. #1 | Page No."P1" | I WANT TO KNOW D·· |
| 10:17 | User1 | PRESENTATION No. #1 | Page No."P1" | I WANT TO KNOW M ·· |
| 10:19 | User5 | PRESENTATION No. #1 | Page No."P1" | I WANT TO KNOW F ·· |
| 10:23 | User4 | PRESENTATION No. #1 | Page No."P1" | I WANT TO KNOW THI · |
| 10:25 | User1 | PRESENTATION No. #1 | Page No."P1" | IT WAS EASY TO |
| 10:34 | User1 | PRESENTATION No. #1 | Page No."P3" | I WANT TO KNOW ··· | x050 ⋮

FIG.8

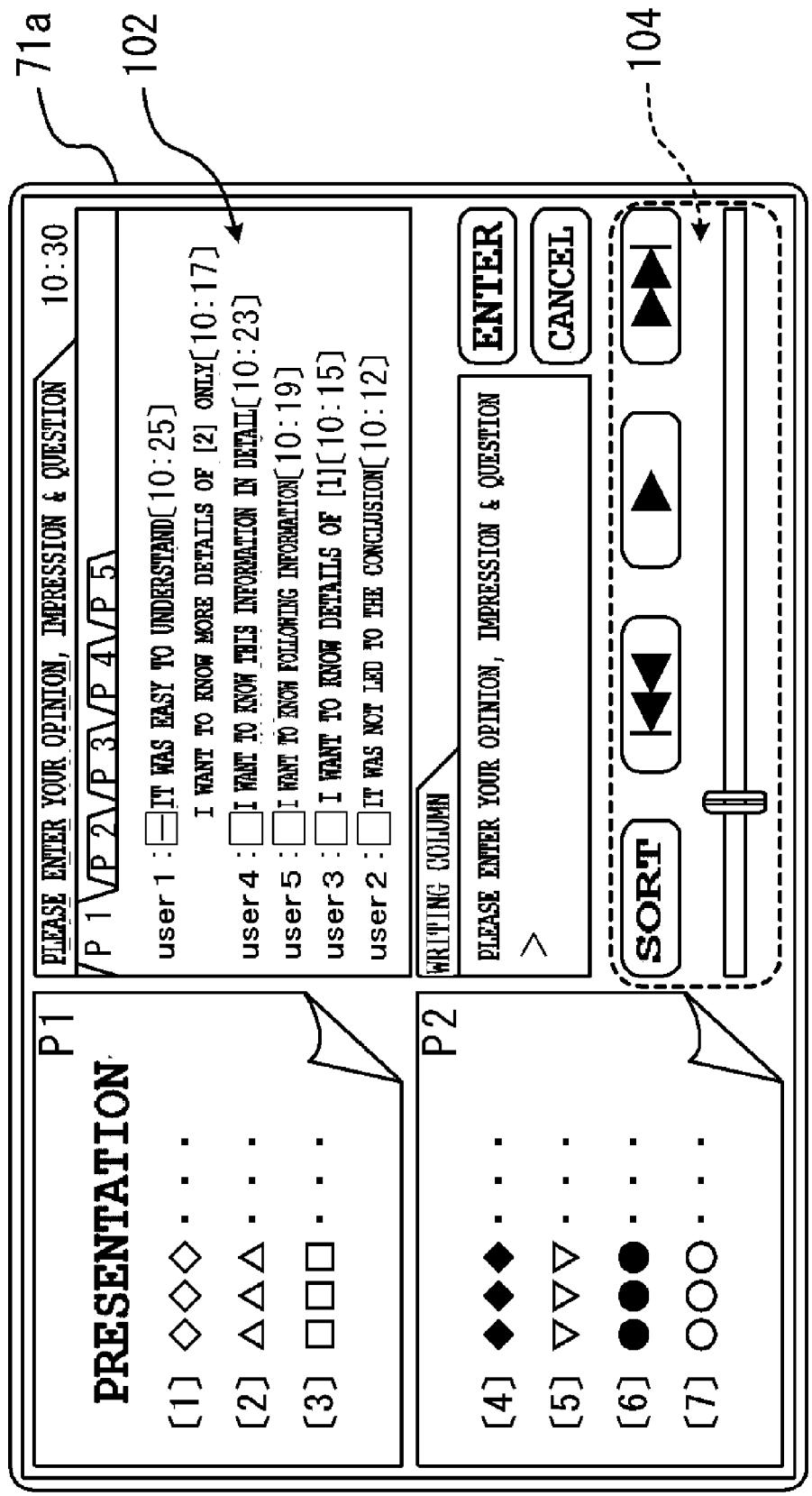

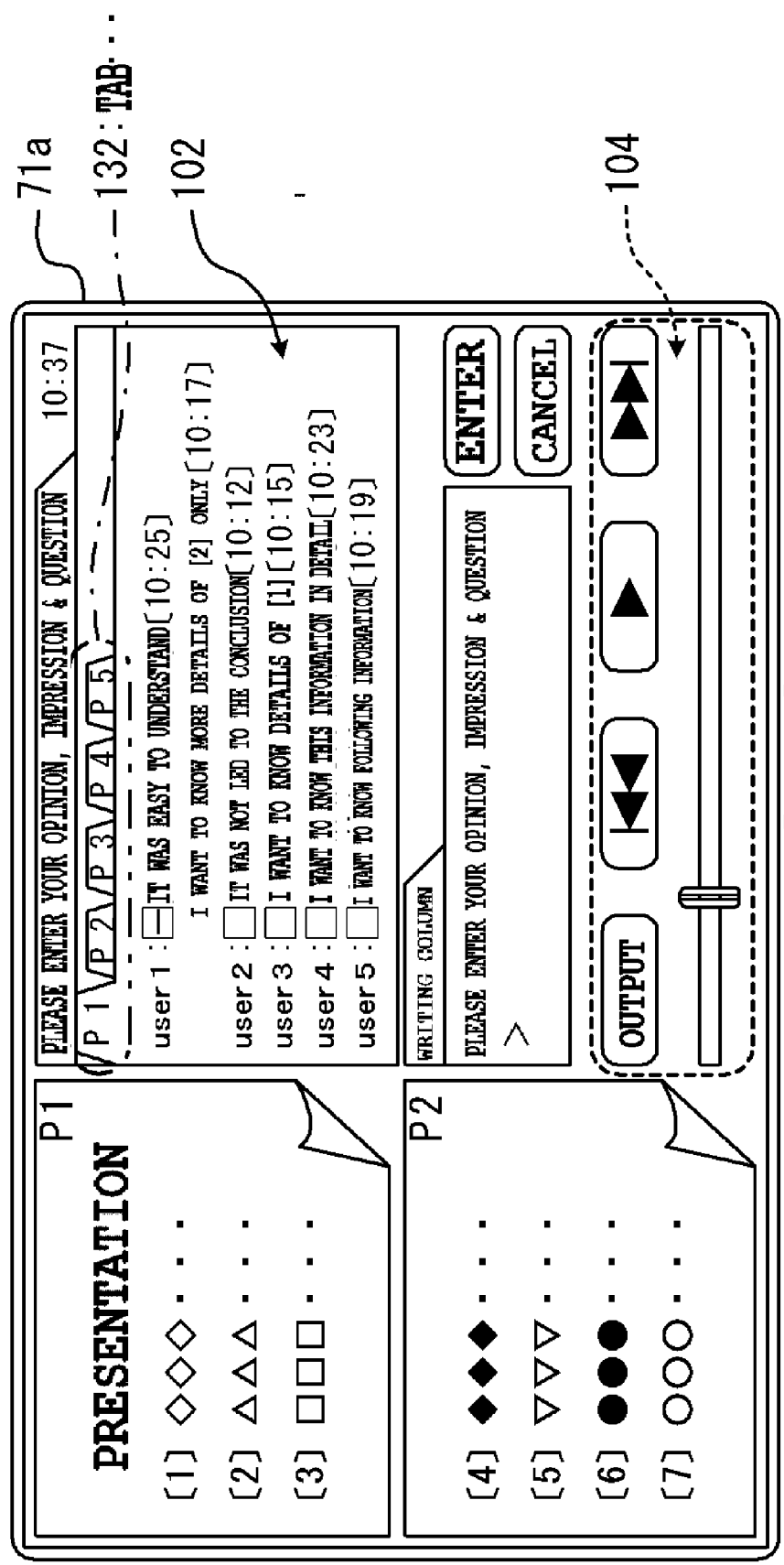

INFORMATION PROCESSING DEVICE AND INFORMATION PROCESSING METHOD

INCORPORATION BY REFERENCE

This application is based on and claims the benefit of priority from Japanese Patent Application No. 2014-111551 filed on May 29, 2014, the contents of which are hereby incorporated by reference.

BACKGROUND

The present disclosure relates to an information processing device that holds various pieces of information including a presentation material which the presenter presents during a presentation, conference, seminar, or the like, and in addition to recovers, accumulates, organizes and outputs variety of pieces of information including an answer to a questionnaire, opinion, impression, question or the like that the audience raises.

In a presentation (including an announcement in a conference and seminar) or the like, sometimes, the presenter (or lecturer) issues a questionnaire to the audiences for confirming their degrees of understanding or receives a question.

However, in a case where the schedule (timing) of issuing the questionnaire or the question-and-answer is set at an epilogue stage of the presentation, even if the audience comes to have an opinion, impression, or question during the presentation, it is usually difficult to transmit such pieces of information to the presenter in a timely and sufficient manner. Thus, there is provided a technology that is capable of eliminating such a drawback.

SUMMARY

An information processing device according to the present disclosure includes a memory part and a control part and is connected with first and second information terminals. The memory part memorizes various kinds of information including a presentation material that is formed of a plurality of page numbers and is presented from one or more presenters to one or more audiences. The control part reads out the various kinds of information including the presentation material from the memory part and write variety kinds of information on the memory part. The first information terminal outputs the various kinds of information including the presentation material and is inputted with an operation instruction from the one or more presenters. Each of the second information terminals is assigned with an individual unique identification number, outputs the variety kinds information, and is inputted with character string information items and operation instructions from the corresponding audience. The control part causes the memory part to prepare an audience writing area on which an information set is recorded additionally that is made up of the character string information inputted by the audience and the variety kinds of information. The control part causes each of the one or more second information terminals to read out and output the character string added with the page number selected by a concerned one or more second information terminals from the audience writing area. In addition, the control part records additionally the information combination on the audience writing area which is formed of the character string entered from the concerned one or more second information terminals, the selected page number, and one or more terminal identification numbers assigned to the concerned one or more second information terminals. Further, the control part causes the first terminal to read out and out put the information combination added with the page number selected by the one or more first information terminals from the audience writing area.

An information processing method according to the present disclosure is implemented by an information processing device that includes a memory part and a control part, and is connected with first and second information terminals. The memory part memorizes various kinds of information including a presentation material of plural page numbers which is to be presented from one or more presenters to one or more audiences. The control part reads out the various kinds of information including the presentation material from the memory part and write variety kinds of information thereon. The first information terminal outputs the various kinds of information including the presentation material and is inputted with an operation instruction from the presenter. The one or more second information terminals are assigned with individual unique identification numbers, output the variety kinds of information, and are inputted with character string information items and operation instructions from the one or more audiences. With the preceding information processing device, an audience writing area is provided on which an information set is recorded additionally that is made up of the character string information inputted by a concerned one or more audiences and the variety kinds of information. Then, the concerned one or more second information terminals are caused to read out only the character string that is added with the page number selected by each of the concerned one or more second information terminals from the audience writing area and to output the resulting the only character string, and in addition each of the concerned one or more second information terminals records additionally the information combination on the audience writing area which is formed of the character string entered from the concerned one or more second information terminals, the selected page number, and one or more terminal identification numbers assigned to the concerned one or more second information terminals. Further, the first information terminal is caused to read out the information combination added with the page number selected by the first information terminal from the audience writing area and to output the resulting information combination from the first information terminals.

BRIEF DESCRIPTION OF THE DRAWINGS

FIG. 6A is a screen diagram on the mobile terminals 73 which is related to a first feature (linkage concept) of the present disclosure.

FIG. 6B is a screen diagram on the mobile terminal 73-3 which is related to the first feature of the present disclosure.

FIG. 8 is a memory map that illustrates each area formed on a memory part 12 and contents recorded on the each area.

FIG. 10B is a screen diagram on the video monitor 71a which is related to the third feature of the present disclosure.

FIG. 12A is a screen diagram on the video monitor 71a which is related to a fifth feature (output in combination) of the present disclosure.

DETAILED DESCRIPTION

Figure 1:
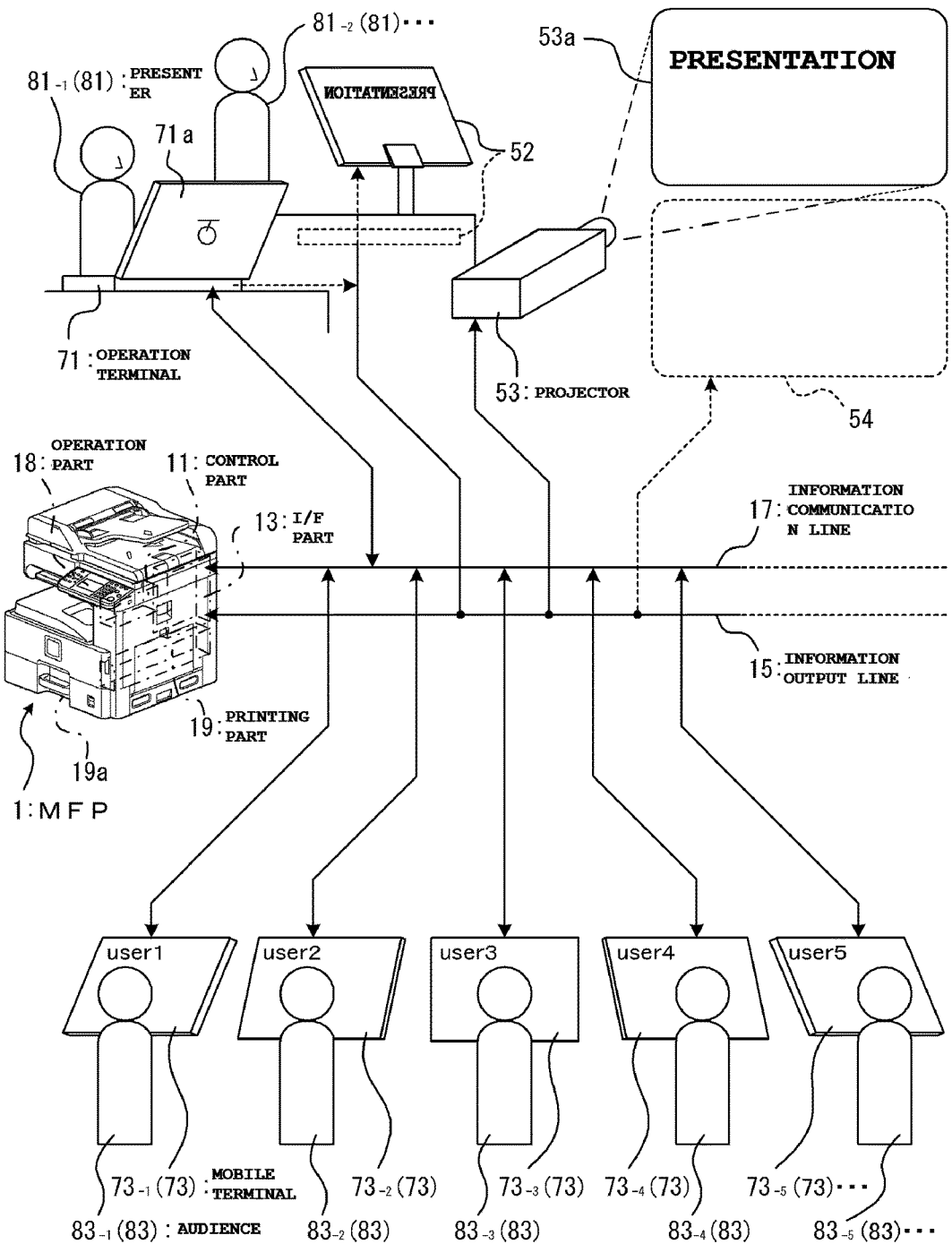
FIG. 1 is a connection and layout plan that illustrates an overall configuration of an exemplary embodiment according to the present disclosure.

Next, with reference to the attached drawings, exemplary embodiments of the present disclosure will be described in detail. Throughout the drawings, like reference numerals refer to identical or functionally similar elements.

(Configuration)

An exemplary embodiment of the present disclosure provides a configuration in which a plurality of external devices are coupled to an MFP (Multi Function Peripheral) 1 that is installed inside or near a hall in which a presentation or the like is held.

Figure 2:
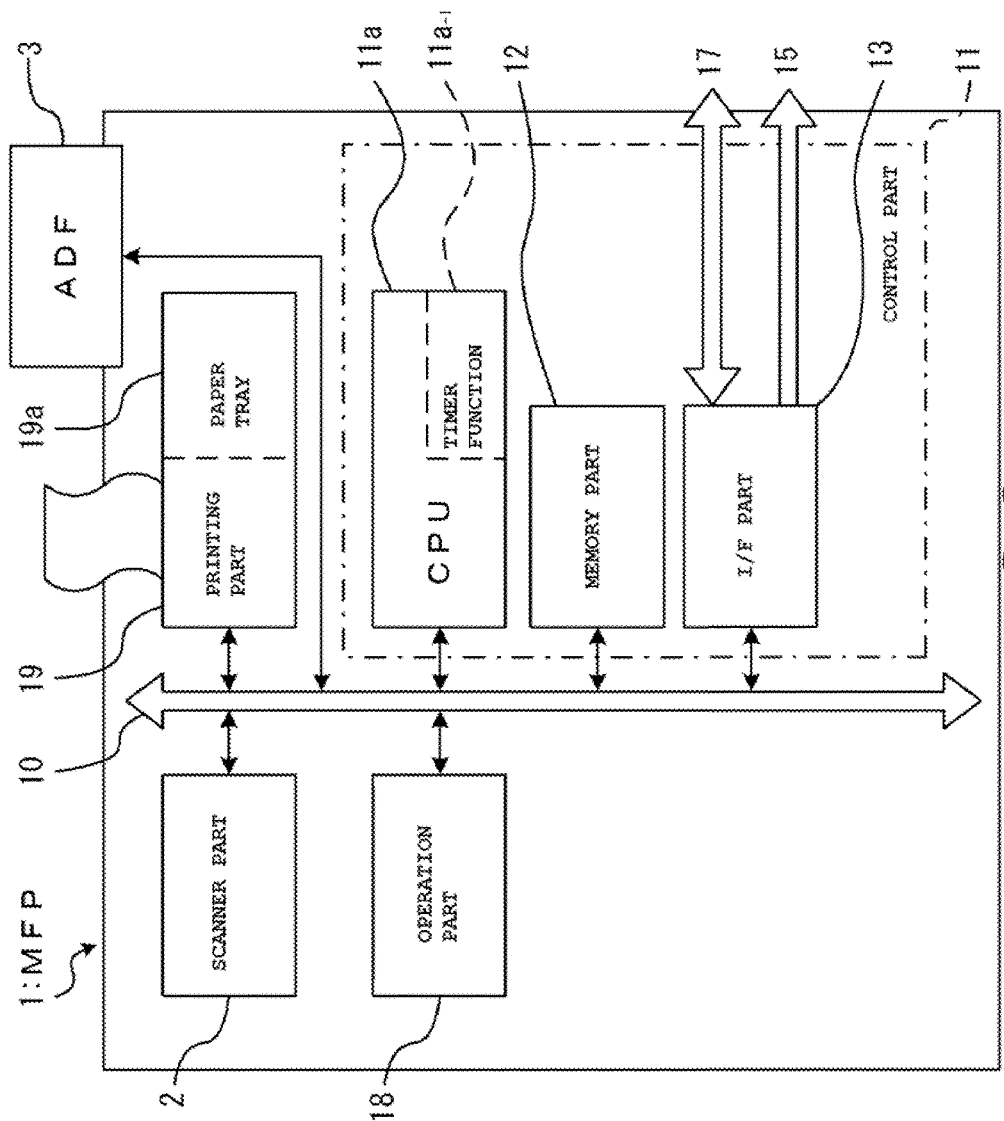
FIG. 2 is a block diagram that illustrates a configuration of an MFP 1 as a principal element of the exemplary embodiment according to the present disclosure.

Referring to FIG. 1 and FIG. 2, the MFP 1 includes a scanner part 2 with an ADF (Auto Document Feeder) 3, an I/F (Interface) part 13, a control part 11, an operation part 18, and a printing part 19, and a paper tray 19a. All these parts are connected to a bus line 10.

The aforementioned scanner part 2, the ADF 3, and the operation part 18 do not characterize the gist or feature of the present disclosure and are general or known structures, and therefore their detailed descriptions will be omitted. It is to be noted that the paper tray 19a houses recording papers in a stacked manner on which one or more images are to be formed by the printing part 19.

The control part 11 includes a CPU (Central Processing Unit) 11a, a memory part 12, and the aforementioned I/F part 13. In addition, the CPU 11 has a time counting function (time counting part) 11a-1. It is to be noted that strictly speaking causing the MFP 1 to operate is realized by a processing of the CPU 11. However, in the present exemplary embodiment, for convenience of explanation, the operation of the MFP 1 will be described as an operation of the control part 11.

As the memory part 12, a recording medium is employed that is not configured to record a piece of information in a temporal manner.

The memory part 12 records a digitalized material for a presentation, contents and an issued time of questionnaires, answers to the questionnaires, opinions or impressions and questions to the presentation, and time instants at which the last four actions are done (details will be described later).

The I/F part 13 is connected with an information line 15 and an information communication line 17. In the present exemplary embodiment, the information output line 15 is used mainly to output information that is related to a presentation material or the like.

The information output line 15 is also connected with a video monitor 52 (a teleprompter is employed as an example thereof), a projector 53, and the like for the projection of the presentation material in accordance with a progress of the presentation.

It is to be noted that the projector 53 is a device to project an image onto a screen 53a. However, sometimes, the video monitor 54, which is capable of directly displaying an image, is connected to the information output line 15.

The information communication line 17 is used, in the present exemplary embodiment, mainly for receiving an opinion, a comment, and a question or for recovering reply results of a questionnaire during the presentation.

The information communication line 17 is connected with an operation terminal (first information terminal) 71 such as a computer terminal device or the like and mobile terminals (second information terminals) 73-1, 73-2, 73-3, 73-4, 73-5 and more (hereinafter that are simply referred to as mobile terminals 73 when necessary).

It is to be noted that sometimes a configuration may be established in which the aforementioned video monitor 52, the projector 53 (or the video monitor 54) and the like are connected to the information communication line 17, while the video monitor 52 is connected to the information communication line 17 or the operation terminal 71.

In addition, sometimes, the information communication line 17 may be connected with another computer terminal device (that is not directly used in a presentation that is being in implementation) and may be in mutual connection with another LAN by way of a WAN (Wide Area Network), which are not illustrated and described in detail.

The operation terminal 71 has a video monitor 71a. The operation terminal 71 is a device by which presenters 81-1, 81-2, and more refer to the presentation material.

It is to be noted that hereinafter the presenters 81-1, 81-2, and more are referred to simply as presenters (that means speaker) 81 when necessary and sometimes one of the presenters alone acts as a facilitator and concurrently as an operator. In addition, there may be case in which the presenter 81-1 is in charge of operating the operation terminal 71 in accordance with the progress of the presentation that is being implemented by the presenter 81-2.

In addition to the aforementioned matter, the operation terminal 71 is also used for operations that include issuing a questionnaire, gathering answers of the questionnaire, and referring to contents of the answers.

For this reason, the operation terminal 71 is, as an input device, either equipped with a keyboard and a pointing device or configured to be connectable with the preceding devices. Alternatively, the video monitor 71a also may be configured to have a touch screen function (Illustrating all the configurations is omitted).

Indeed the video monitor 52 is a device by which the presenter (s) 81 refers (refer) to the presentation material. However, as an example, the video monitor 52 is allowed to display an image that is identical to the image to be displayed on the video monitor 71a.

The mobile terminals 73-1, 73-2, 73-3, 73-4, 73-5, and more are devices by which respective audiences 83-1, 83-2, 83-3, 83-4, 83-5, and more (each of which means a listener and which are hereinafter referred to simply as audiences 83 when necessary) refer to a message (messages) issued from the presenter (s) 81. Each of the mobile terminals 73 has a touch screen functionality (not shown) that serves for entering (inputting) the answers of the questionnaire, a question item asked to the presenter (s) 81 and the like.

In addition, in the present exemplary embodiment, the mobile terminals 73-1, 73-2, 73-3, 73-4, 73-5, and more are assigned with respective terminal IDs "user 1", "user 2", "user 3", "user 5", and more.

The presentation material for the audiences (s) 83 is displayed on the screen 53a (or the video monitor 54). Besides this, a message that urges the audiences (s) 83 to reply to the questionnaire and the like are displayed. In addition, sometimes, the presentation material for the audiences (s) 83, the message that urges the audiences (s) 83 to reply to the questionnaire and the like are displayed on the mobile terminal (s) concurrently.

Incidentally, the video monitor (teleprompter) 52, the projector 53 (or the video monitor 54), the operation terminal 71, and the mobile terminals 73 are of general or known structures, and therefore their detailed descriptions will be omitted.

In the present exemplary embodiment, the presentation material, a content of the questionnaire that is expected to be issued during the presentation, a time instant when the questionnaire is issued, and the like are digitalized by application software for presentation. The resulting digitalized information is recorded on the memory part 12.

The control part 11 of the MFP 1 reads out the digitalized information that is recorded on the memory part 12 by an order or instruction that is issued from the operation terminal 71. The control part 11 sends an image to the operation terminal 71, the video monitor 52, the projector 53 (or the video monitor 54), and the mobile terminals 73 in such a manner that a display form and a signal form of the image are differentiated to confirm with attributes of the respective these signal receiving devices.

Figure 3:
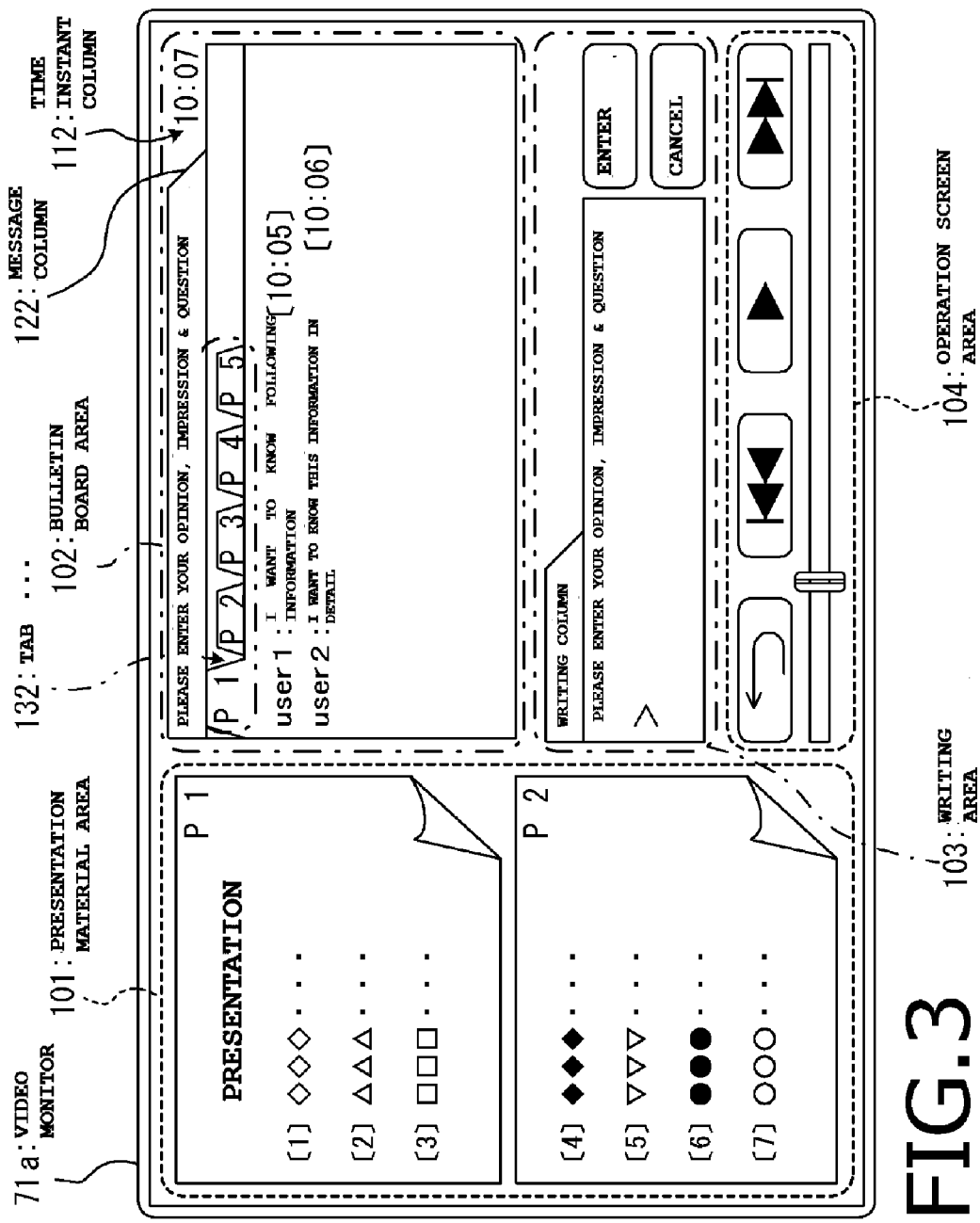
FIG. 3 is a screen diagram that is an exemplary image displayed on a video monitor 71*a*.

An example of the image that is to be displayed on the video monitor 71a is depicted in FIG. 3. The image that is displayed on the video monitor 71a provides a presentation material area 101, a bulletin board area 102, a writing column 103, and an operation panel area 104.

On the presentation material area 101, one or more pages of the presentation material are displayed that is recorded in a digitalized manner in a digitalized manner on the memory part 12 of the MFP 1.

The presentation material that is displayed on the presentation material area 101 is assigned with one or more corresponding page numbers. For example, on the presentation material area 101, two pages of the presentation material are displayed vertically and page numbers "P1" and "P2" are assigned to upper-half and lower-half screen displays, respectively.

The bulletin board area 102 is provided at its upper part with a time instant column 112, a message column 122, and one or more tabs 132 that acts as one or more indexing knobs for indicating the page numbers "P1", "P2", "P3", and more. The time instant column 112 displays a time instant, for example, that is measured by the time counting functionality 11a-1 (see FIG. 2).

The number of the tabs 132 is in correspondence with the page numbers of the presentation material. The page numbers "P1", "P2", "P3", and more that are indicated by the tabs 132 are in correspondence with the page numbers of the presentation material.

In addition, regarding the plural tabs 132, it is possible to select only one of the tabs 132 by manipulating the keyboard, the pointing device, and the touch screen functionality that have been previously mentioned.

Furthermore, a specific one of the tabs 132 is allowed to project upward (pop up) relative to the other tabs 132 and to be differentiated from the other tabs 132 in color tone (color combination). Thereby, the one or more presenters 81 are allowed to recognize the screen easily and to be attracted to the screen, which will be detailed later.

The bulletin board area 102 displays answers to the questionnaire that relates to the selected page from the audiences 83, one or more questions to the presenter (s) 81, the terminal ID of the mobile terminal that is used to entry each of the preceding items and a time instant of such an entry.

The writing column 103 displays a message (character string) and a transmission history, the message (character string) being currently entered (inputted) for being transmitted from the presenter (s) 81 to the audiences 83.

The operation panel area 104 is GUI (Graphical User Interface) windows at which icons are provided that are indicative of operation buttons and a slide knob in a symbolic manner. The presenter (s) 81 is (are) capable of manipulating these operation buttons and the slide knob by using the pointing device and the touch screen functionality, thereby switching the images of the presentation material area 101 and the bulletin board area 102 (page) and operating various functions that are available in the present exemplary embodiment. Incidentally, changing the icon (s) will allow the operation panel area 104 to be allocated with various functions and therefore hereinafter the name "operation panel area 104" remains unchanged even though the icon (s) and available function (s) are changed.

Figure 4:
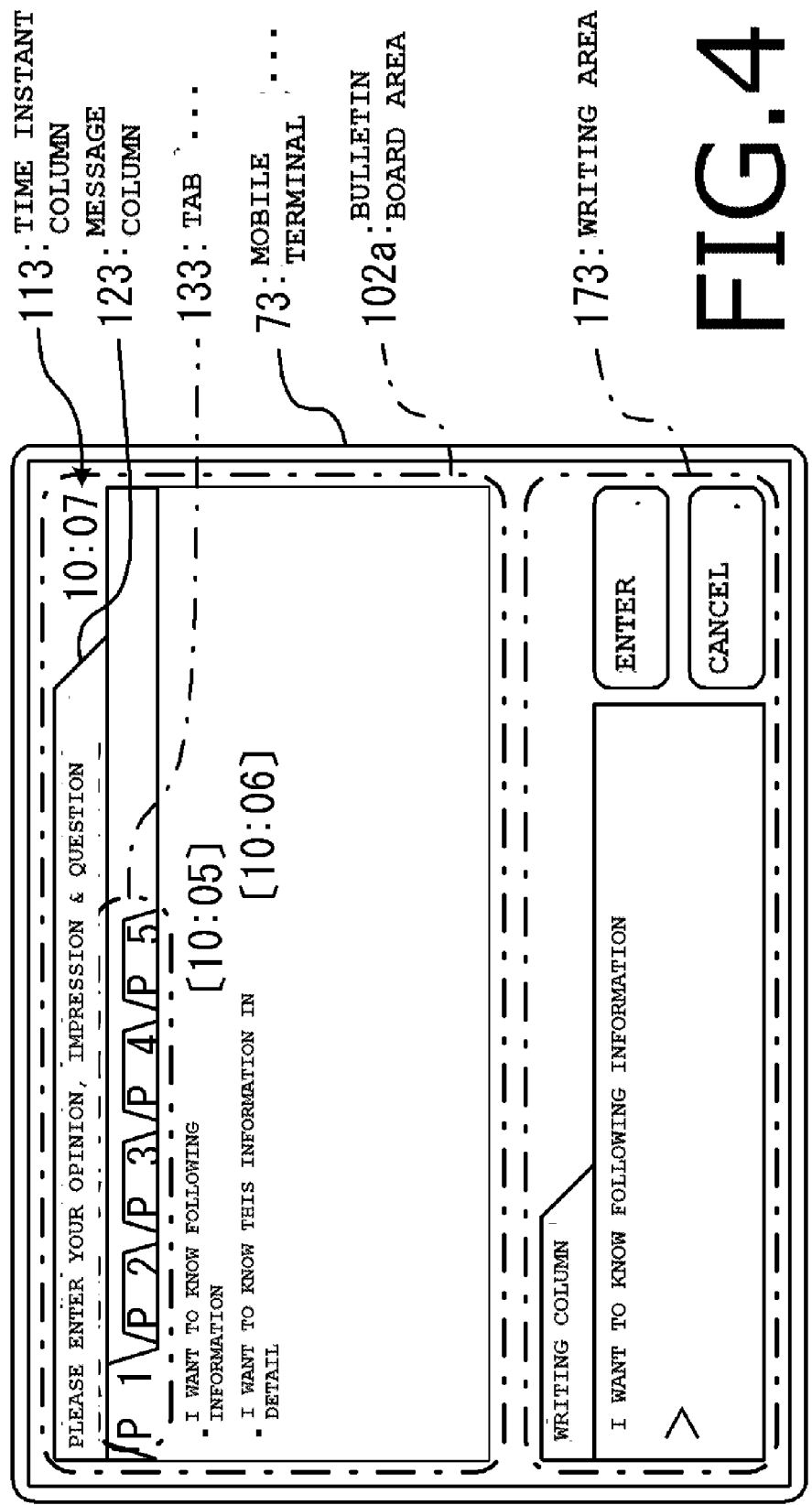
FIG. 4 is a screen diagram that is an exemplary image displayed on mobile terminals.

An example of the image that is displayed on the mobile terminal (s) 73 is depicted in FIG. 4. The image displayed on each of the mobile terminal (s) 73 is provided with a bulletin board area 102a and a writing column 173.

The bulletin board area 102a is provided at its upper part with a time instant column 113, a message column 123, and one or more tabs 133 that acts as one or more indexing knobs for indicating the page numbers "P1", "P2", "P3", and more. The time instant column 113 displays a time instant, for example, that is measured by the time functionality 11a-1 (see FIG. 2).

The number of the tabs 133 is identical with the page numbers of the presentation material. The page numbers "P1", "P2", "P3", and more that are indicated by the tabs 133 are in correspondence with the page numbers of the presentation material.

In addition, regarding the plural tabs 133, it is possible to select only one of the tabs 133 by manipulating the aforementioned touch screen functionality.

A specific one of the tabs 133 is differentiated from the others in color tone (color combination) (In FIG. 4, the "P1" is different from the "P2"-"P5" in color combination.) Simultaneously, allowing the tab to project (pop up) from the others will makes it possible to realize which tab (page number) is being selected.

The bulletin board area 102a displays answers from the audiences 83 to the questionnaire that relates to thus selected page, one or more questions to the presenter (s) 81, the terminal ID of the mobile terminal that is used to entry each of the preceding items and a time instant of such an entry.

The writing column 173 displays a message (character string) for being transmitted from the presenter (s) to the audiences 83 which is currently being entered (inputted) and a transmission history thereof.

Figure 5:
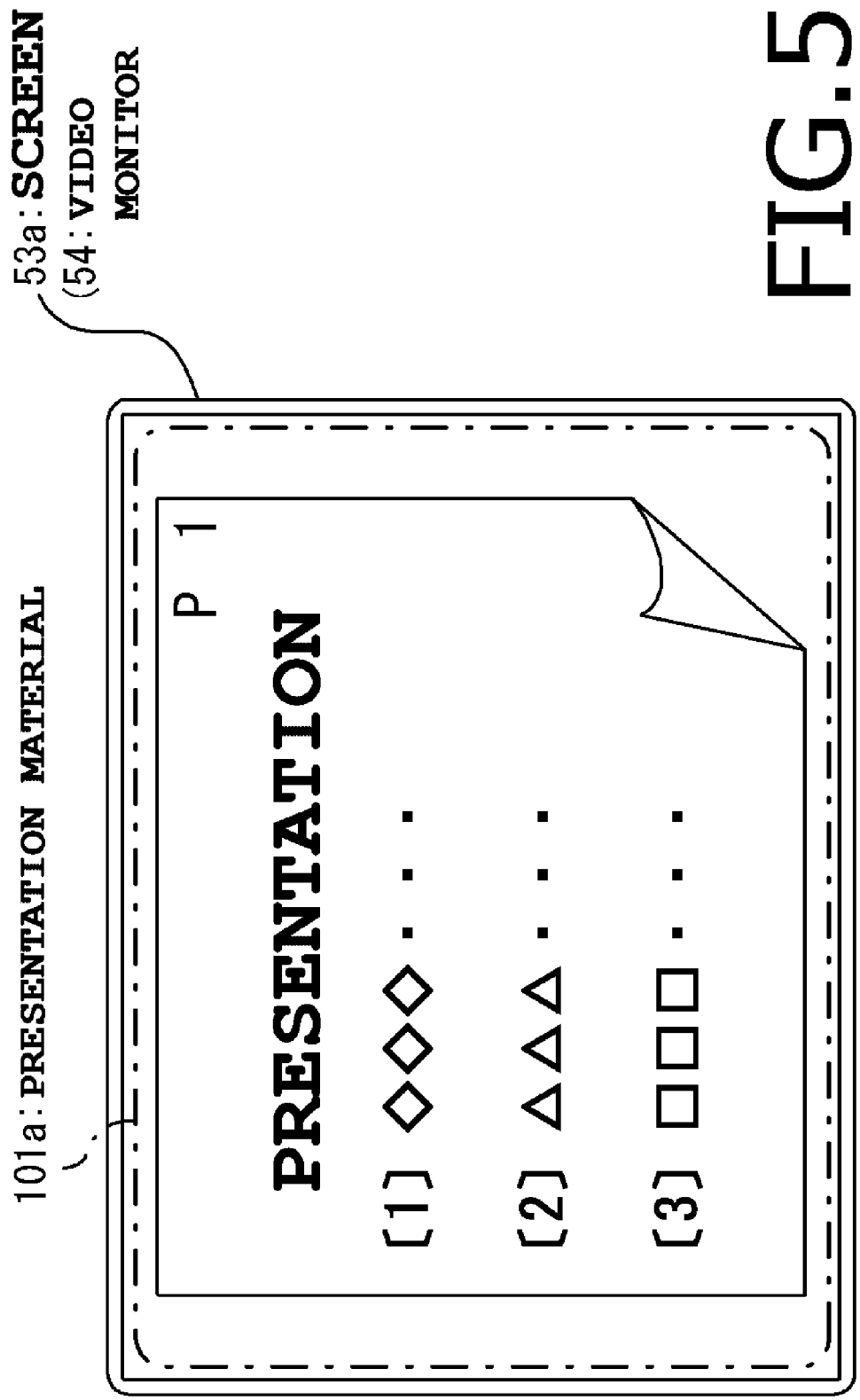
FIG. 5 is a screen diagram that is an exemplary image displayed on a screen 53*a* or a video monitor 54.

An example of the image that is displayed on the screen 53a (or the video monitor 54) is shown in FIG. 5. Mainly, a presentation material 101a is displayed on the screen 53a (or the video monitor 54) on which the projector 53 project a image.

Under such a configuration, a virtual bulletin board is provided (on the memory part 12) on which a comment or the like is to be written for each page number of the presentation material of plural pages that is recorded on the memory part 12 in a digitalized manner, and all the mobile terminals 73 are allowed to refer to the virtual bulletin of an arbitrary page number. And, it is possible to write the comment or the like on the virtual bulletin board of the selected page number. In addition, the operation terminal 71 is capable of referring to the virtual bulletin board of an arbitrary page number.

(First Feature)

Figure 6C:
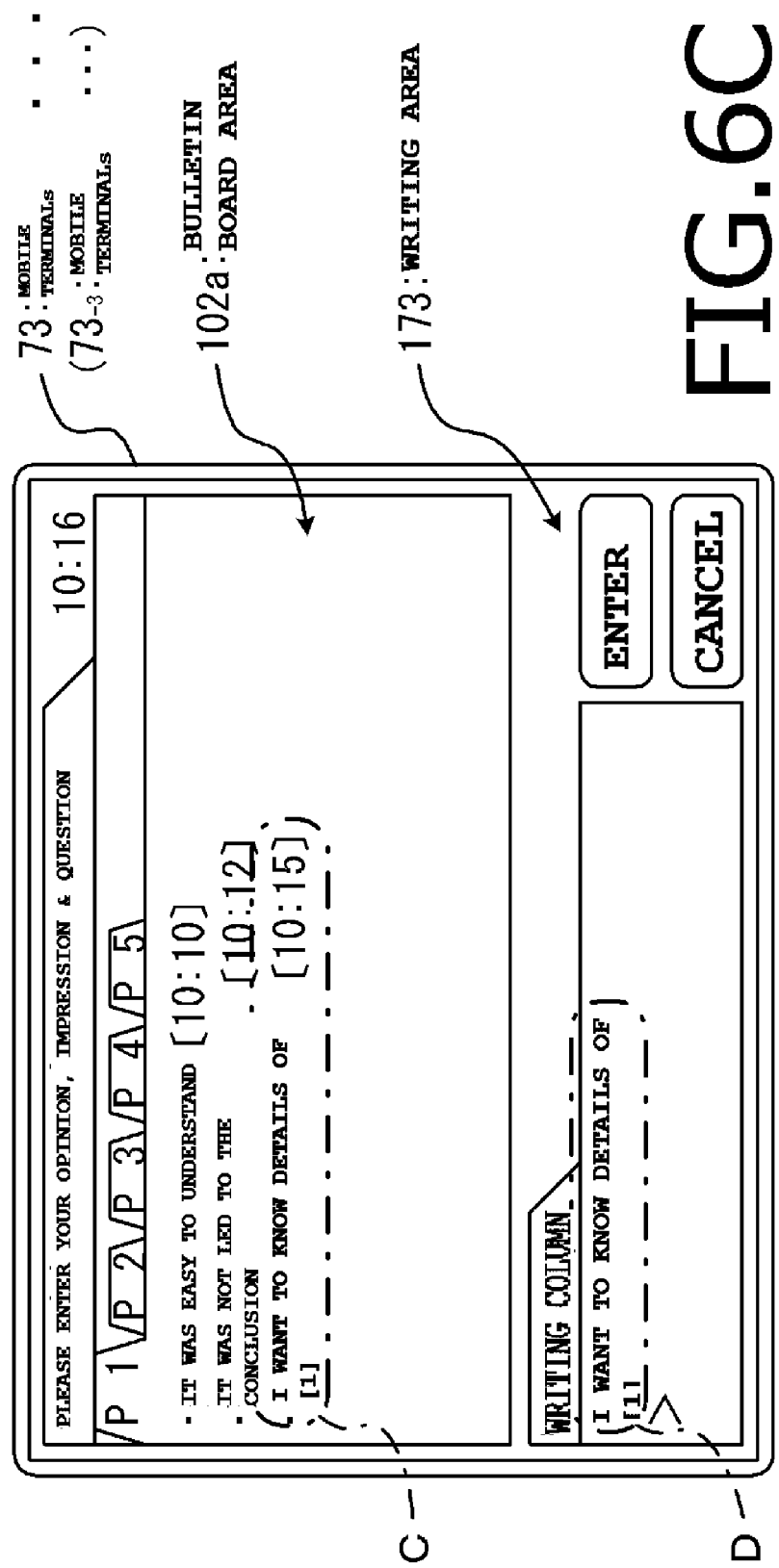
FIG. 6C is a screen diagram on the mobile terminal 73-3 which is related to the first feature of the present disclosure.
Figure 7A:
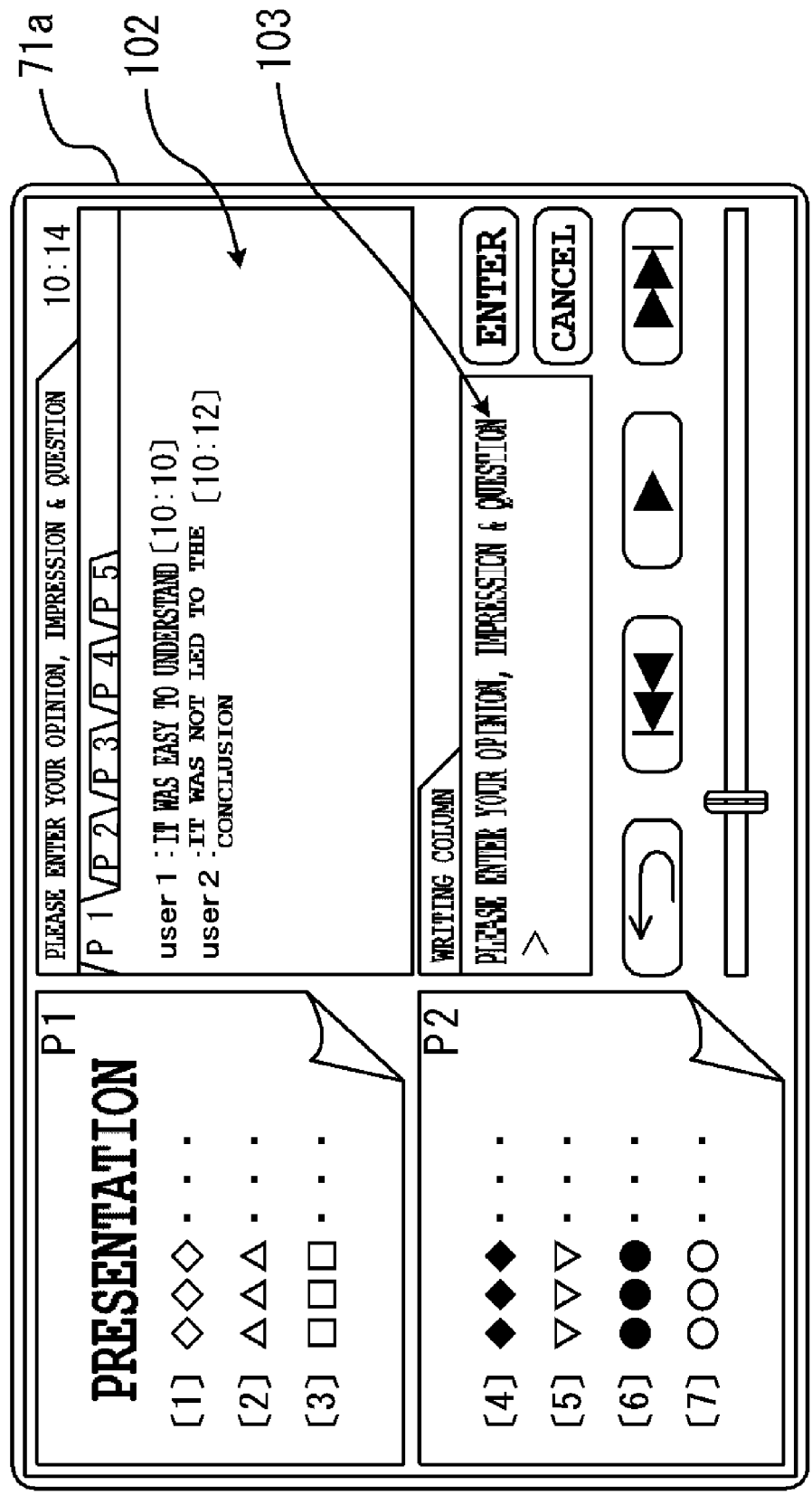
FIG. 7A is a screen diagram on the video monitor 71a which is related to the first feature of the present disclosure.
Figure 7B:
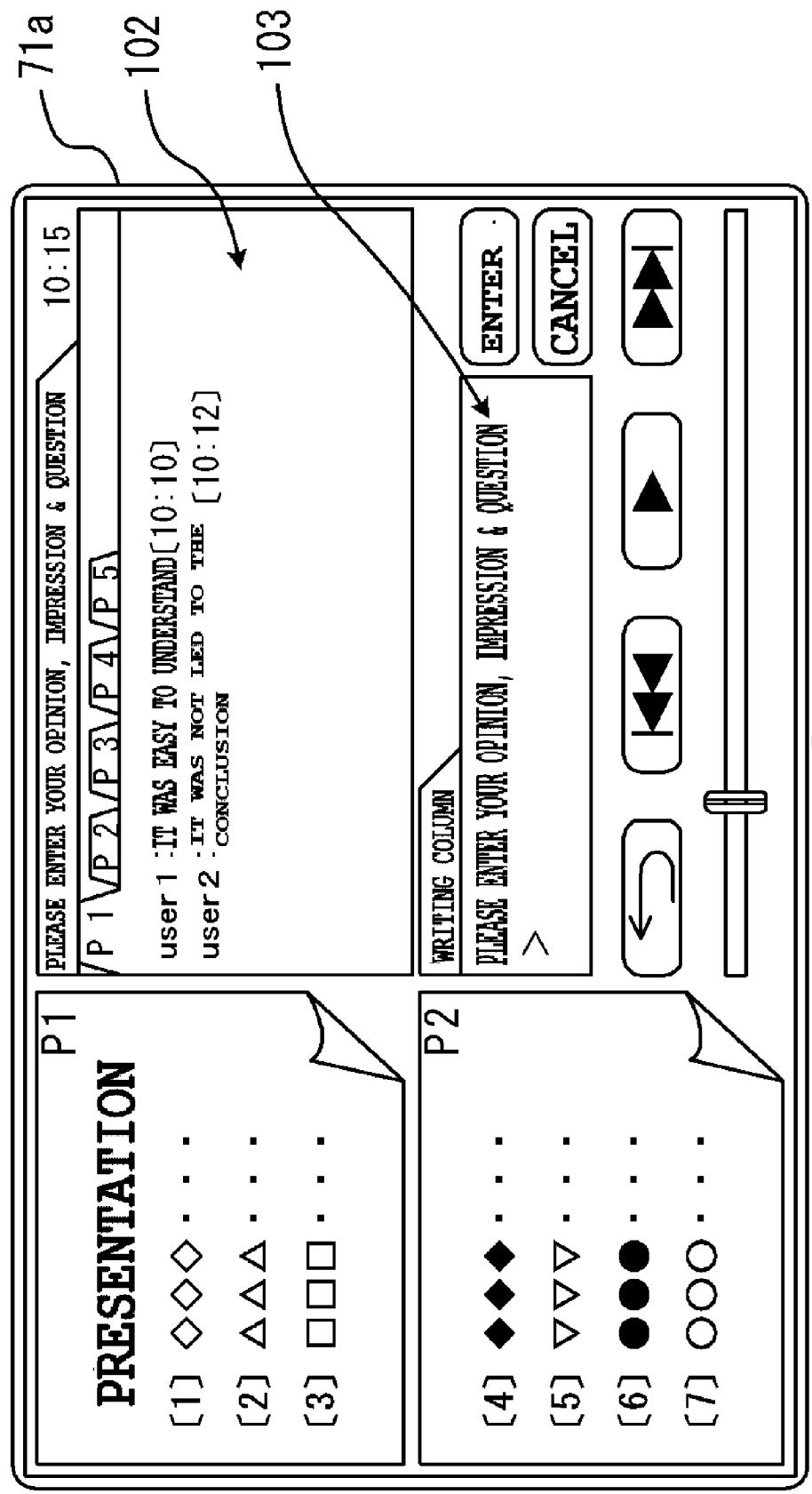
FIG. 7B is a screen diagram on the video monitor 71a which is related to the first feature of the present disclosure.
Figure 7C:
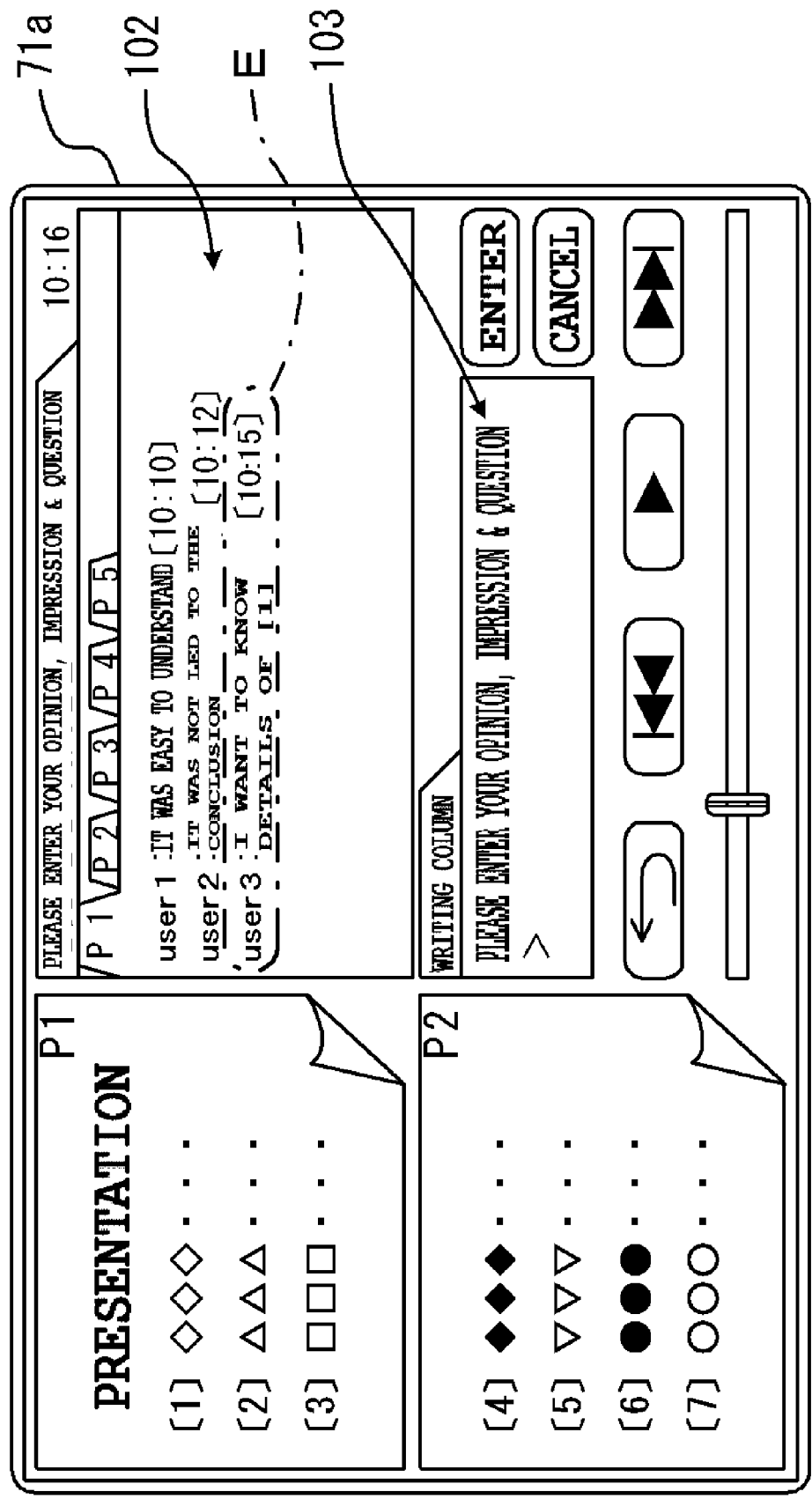
FIG. 7C is a screen diagram on the video monitor 71a which is related to the first feature of the present disclosure.

As to when one of the mobile terminals 73 (i.e., the mobile terminal 73-3) is manipulated to propose a comment, how the resulting image is displaced thereon in the present exemplary embodiment is illustrated in FIG. 6A, FIG. 6B, and FIG. 6C. In addition, how an image that is currently displayed on the video monitor 71a is depicted in FIG. 7A, FIG. 7B, and FIG. 7C. Here, the image of FIG. 7A and the image of FIG. 6A are of an identical displayed time instant, the image of FIG. 7B and the image of FIG. 6B are of an identical displayed time instant, and the image of FIG. 7C and the image of FIG. 6C are of an identical displayed time instant.

In FIG. 6A, the bulletin board area 102a indicates that the tab 133 is selected whose page number indication is "P1" and displays an opinion, an impression, and a question to the page number "1" of the presentation material, and a time instant when each of these actions is raised. In addition, the writing column 173 is in entry (input) standby state (The symbol ">" is an indication of the entry beginning).

In also FIG. 7A that corresponds to FIG. 6A, the bulletin board area 102 indicates that the tab 132 is selected whose page number indication is "P1" and displays the comment, the comment including the opinion, the impression, and the question to the page number "1" of the presentation material, and the time instant when each of these actions is raised, and the terminal ID of the mobile terminal that is used to raise the comment.

In FIG. 6B, as indicated by the symbol A, a character string (hereinafter referred to as character string A) is entered that is a comment (opinion) raised by one of the audiences 83 (i.e., the audience 83-1) in the writing column 173. However, at this time instant, no writing operations (that includes, for example, recording on the memory area 12 and additional recording on the bulletin board areas 102 and 102a) are performed, which results in that the bulletin board area 102a depicted in FIG. 6B is identical with the bulletin board area 102a depicted in FIG. 6A in content.

Similarly, the bulletin board area 102 depicted in FIG. 7B is identical with the bulletin board area 102 depicted in FIG. 7A in content.

Thereafter, as indicated by the symbol "B", when an "ENTER" button indication part that is located at right portion of the writing column 173 is manipulated by a touch screen operation, the aforementioned comment is written as the character string A.

At this time instant, the control part 11 (see FIG. 1) records the comment (character string A) on the memory part 12 and concurrently records thereon a time instant when the comment is written (as an example, this time instant is measured by the timer function 11a-1 that is shown in FIG. 2), a terminal ID ("user 3" in FIG. 6 and FIG. 7) of the mobile terminal that is used for the writing operation, a page number (i.e., that is selected by the mobile terminal 73-3) as the target of the comment.

Here, the contents that are to be recorded on the memory part 12 in the present exemplary embodiment will be described. FIG. 8 indicates a relationship between addresses and data sets, wherein each of the addresses is in the form of logical address. An existence of each area and a location relationship are indicated and therefore the size (for example, the number of bytes) of one unit data varies with the content. Based on the physical address, sometimes a set of data (for example, the character string of a comment) is dispersed on a plurality of physical address areas that are not continuous.

The memory part 12 includes a program area (logical addresses x000-x0009) in which programs required for running the MFP 1 and the like are recorded, and a various setting-information area (logical addresses x010-x019) in which a MFP use environment (installation area is recorded, facsimile number, size of stacked recording paper, backlight setting for the operation part 18).

In the present exemplary embodiment, in addition to the preceding areas, there are provided a presentation material area (logical addresses x030-x039) and an audience writing area (logical addresses x040-x049). This audience writing area corresponds to the aforementioned virtual bulletin board.

It is to be noted that a area located under the audience writing area (logical addresses x050 and after), whose description is omitted, is provided for another purpose in FIG. 8.

With the memory part 12 of the present exemplary embodiment, the presenter writing area is further divided into sub-areas including presentation number #1, presentation number #2, and more so that a plurality of different presentation (announcement and lecture) materials can be recorded.

Hereinbelow, a description is related only to the presentation #1. It is to be noted that the contents of each of the presentation #1, presentation number #2, and more are for the sake of convenience and therefore actual data formats and the like depend on an actually used application software and the like.

Referring to FIG. 8, in the area of the presentation number #1, pieces of information ([1] ◊ ◊ ◊ ◊ and more) of the material that is to be disclosed in a presentation are recorded such that lines are reserved for the individual page numbers in a one-to-one manner.

A "presenter writing area" that is prepared for each of the page numbers "P1", "P2", "P3" and more is an area in which are recorded (recording in a successive manner during a presentation) a timing when a questionnaire is issued for confirming degrees of comprehension of the audiences 83, a comment issued together with the questionnaire, and a message issued (that may be issued) that the presenter 81 may notice and issues during the presentation.

In the audience writing area (logical addresses x040-x049), each of the comments that includes the opinions, impressions, and questions that are written by one or more audiences 83 via the individual mobile terminals 73 is combined with various pieces of information related to this comment and the resulting set is recorded in a successive manner (in FIG. 8, one line is prepared for one set). Referring to FIG. 8, in each of the lines of the audience writing area, the "write time instant", the "terminal ID", the "presentation number", and the "comment" constitute a set.

Thus, regarding each of the comments that each of the audiences 83 have written, the control part 11 links (i.e. associates) each of the comments to the corresponding page number of the presentation material and records the resulting data set on the memory part 12.

The control part 11, after recording thus written comment (character string A) on the memory part 12, as indicated by a reference code "C" in FIG. 6C, records additionally the character string A and a time instant when the character string A is written on the bulletin board area 102a. Such an additional record of the character string on the bulletin board area 102a is common for all the remote terminals 73. Thus, all the audiences 83 are capable of recognizing what kinds of answers and/or questions are raised on which page of the presentation material.

Furthermore, as indicated by a reference code "D", the character string A that has been inputted in the writing column 173 is rewritten as a written history line (The line above the code ">" is indicative of the written history line. The character string that has been entered is deleted and is recorded additionally on the written history line. Only the specific one of the mobile terminals 73 (the mobile terminal 73-3 in case of FIG. 6) at which the rewriting operation was made may be allowed to rewrite the writing column 73.

Thereafter, the control part 11, as indicated by a reference code "E" in FIG. 7C, records additionally the character string A, the terminal ID (user 3) of the mobile terminal that is use to write the character string A and the time instant when the character string A is written on the bulletin board area 102. Thus, the presenter (s) 81 is (are) capable of recognizing, at any time, what kinds of answers and/or questions are raised on which page of the presentation material.

Incidentally, with the aforementioned configuration, in a case where an urgent questionnaire other than a scheduled questionnaire is conducted during a presentation, the presenter (s) 81 is (are) also allowed to send a message urging all the audiences 83 to respond to the urgent questionnaire.

For example, when the presenter (s) 81 implements (implement) a writing operation to enter a character string "PLEASE LET ME KNOW YOUR OPINION" and more on the writing column 103 that is depicted in, for example, FIG. 3 and FIG. 7, such a character string "PLEASE LET ME KNOW YOUR OPINION" is displayed on the message column 123 that is depicted in, for example, FIG. 4 and FIG. 6. (In a case where another character string is being displayed, such another character string is replaced with the character string entered by a later writing operation.

Regarding this operation of sending the message to all the audiences 83, illustrating its progress is omitted, but this operation is implemented by manipulating the "ENTER" button indication part after entering the character string, similar to the description with reference to FIG. 6A, FIG. 6B, FIG. 6C, FIG. 7A, FIG. 7B, and FIG. 7C.

However, in such a case, the character string (message) that the presenter (s) 81 writes (write) is not recorded on the "audience writing area" but recorded additionally on a "presenter writing area" on a line of the corresponding page of the corresponding presentation number in, for example, the "presentation material area" of the memory part 12 as shown in FIG. 8.

As described above, in the present exemplary embodiment, when the character string is entered in the writing column 173 from a specific one of the mobile terminals 73 and such an entry is completed, the control part 11 of the MFP 1 records the terminal ID of the specific mobile terminal 73, the write time instant, and the like as well as the entered character string on the memory part 12.

(Second Feature)

Figure 9A:
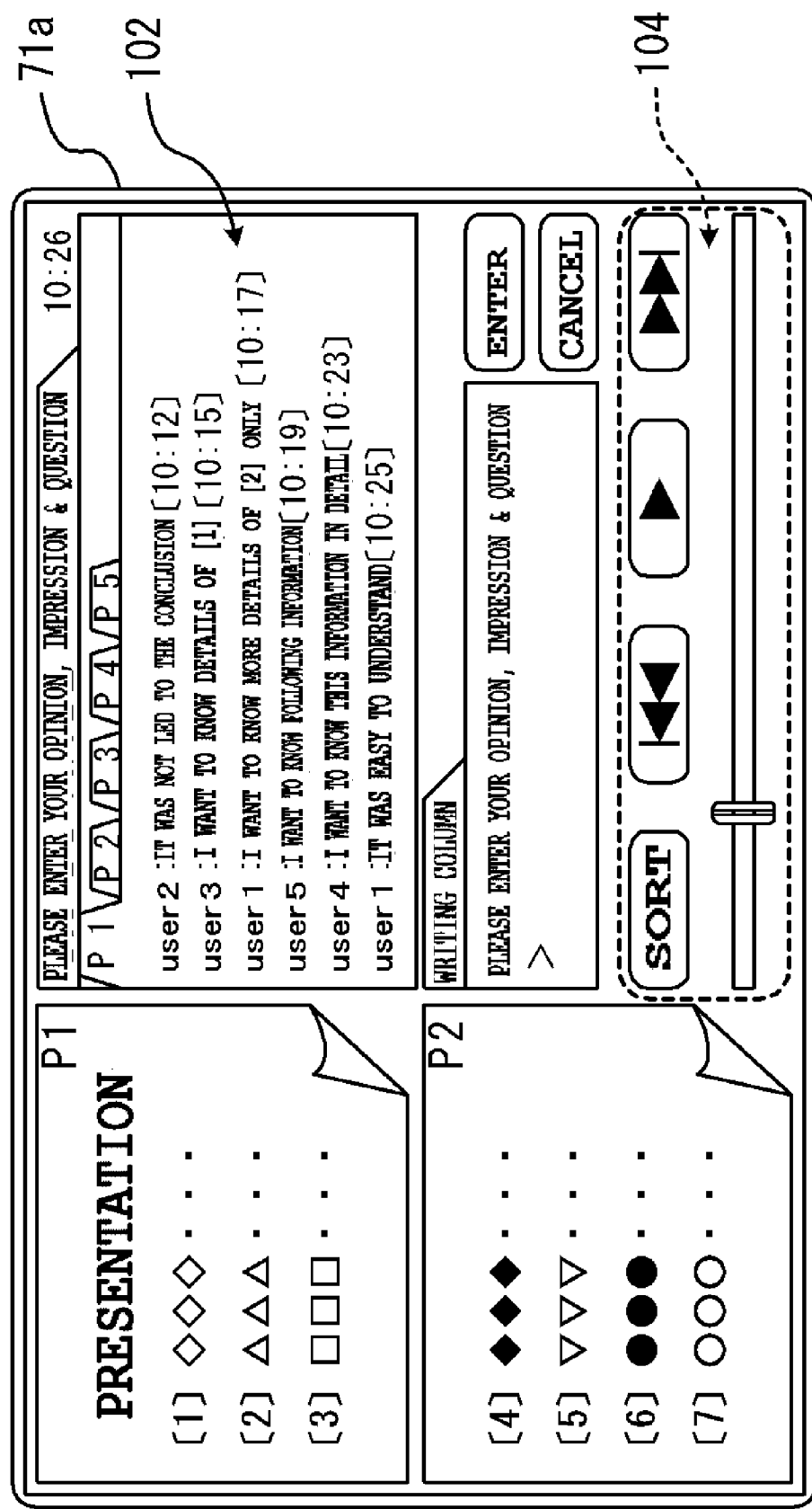
FIG. 9A is a screen diagram on the video monitor 71a which is related to a second feature (organization by terminal ID) of the present disclosure.
Figure 9B:
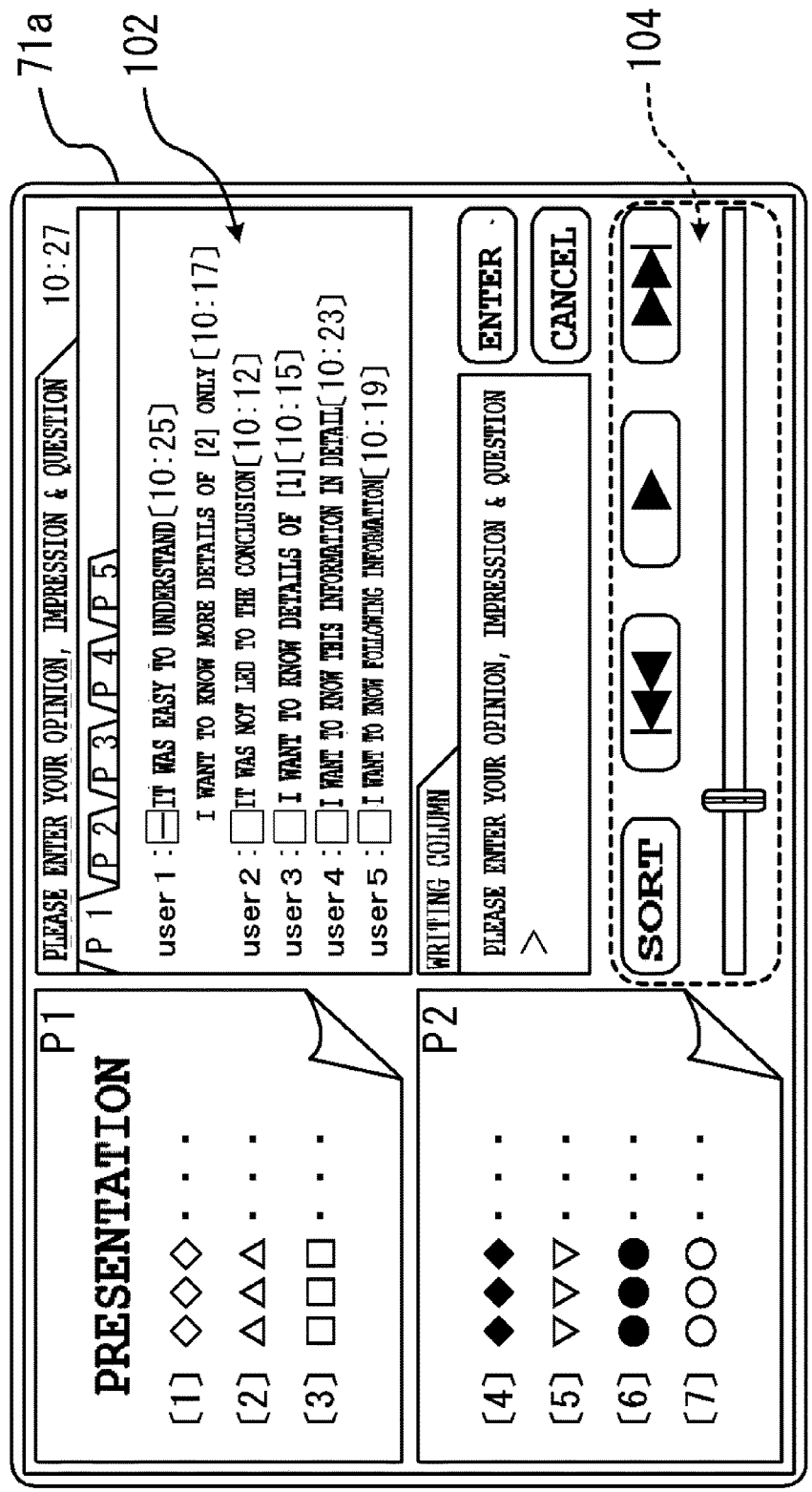
FIG. 9B is a screen diagram on the video monitor 71a which is related to the second feature of the present disclosure.
Figure 9C:
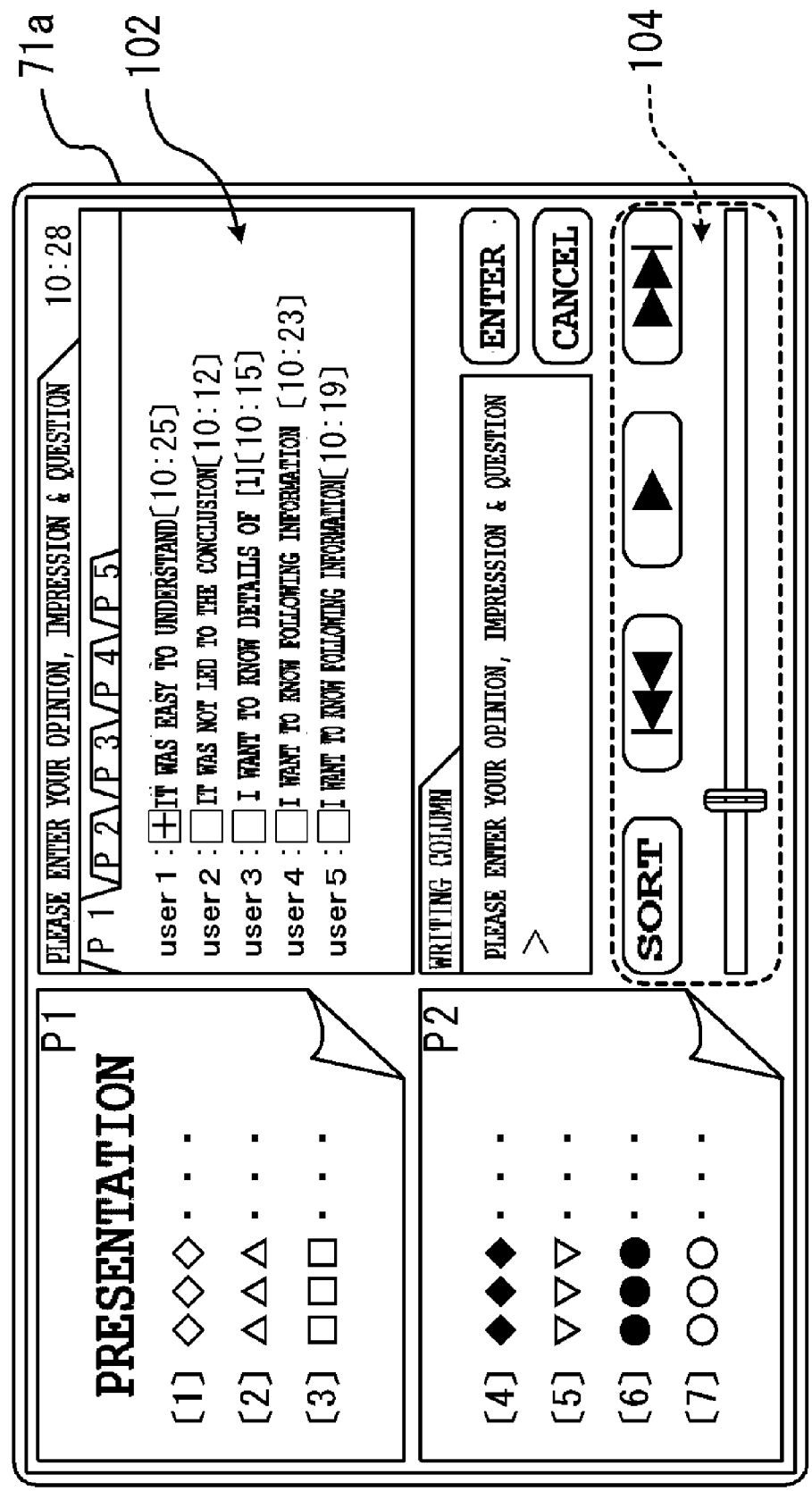
FIG. 9C is a screen diagram on the video monitor 71a which is related to the second feature of the present disclosure.

At this stage, the control part 11 is capable of organizing (sorting), by order of the presenter (s) 81, the character string, the terminal ID, and the time instant that are memorized on the memory part 12. FIG. 9A, FIG. 9B, and FIG. 9c show an example of such an organization.

Referring to FIG. 9A, from this example, it is possible to recognize that plural writings are implemented from the mobile terminal 73 whose assigned terminal ID is "user 1". In such a case, the control part 11 of the MFP 1 changes one of the icons to "SORT" button.

Here, manipulating the "SORT" button on the operation panel area 104 by the presenter (s) 81 allows the bulletin board 102 to change its display as shown in, for example, FIG. 9B.

On the bulletin board area 102 in FIG. 9B, a plurality of writings from a same mobile terminal 73 are summarized into consecutive lines such that the latest writing takes the uppermost line and the writings are sorted by the terminal ID in ascending order from the top.

Executing this sorting is as follows: The audience writing area of the memory part 12 is read in a line by line manner from the top line to select the various kinds of information having the objected page number and the resulting items are recorded temporally on a space area below the audience writing area (logical address x050 and after) for being sorted.

Furthermore, regarding the line, as seen in the bulletin board area 102 shown in FIG. 9B, in which an indication of [−] ([ ] means a character that is placed within a square box) is indicated between the terminal ID and the entered character string, manipulating this indication of [−] using the pointing device or touch screen functionality, as seen from FIG. 9C, allows for concealing (folding) the character strings other than the latest writing from the mobile terminal having this terminal ID.

Incidentally, as seen from the bulletin board area 102 in FIG. 9C, regarding the line in which an indication of [+] is interposed between the terminal ID and the entered character string, manipulating this indication of [+] using the pointing device or touch screen functionality, as seen from FIG. 9B, allows for displaying (spreading) all the character strings entered from the mobile terminal having this terminal ID in consecutive lines.

The examples illustrated in FIG. 9A, FIG. 9B, and FIG. 9C provide an easy comprehension of which mobile terminal (s) 73 fails (fail) to answer, which mobile terminal (s) 73 raises (raise) a question or opinion in a positive manner, and the like, as well as the answer, opinion, and impression to the questionnaire or the content of the question.

(Third Feature)

Figure 10A:
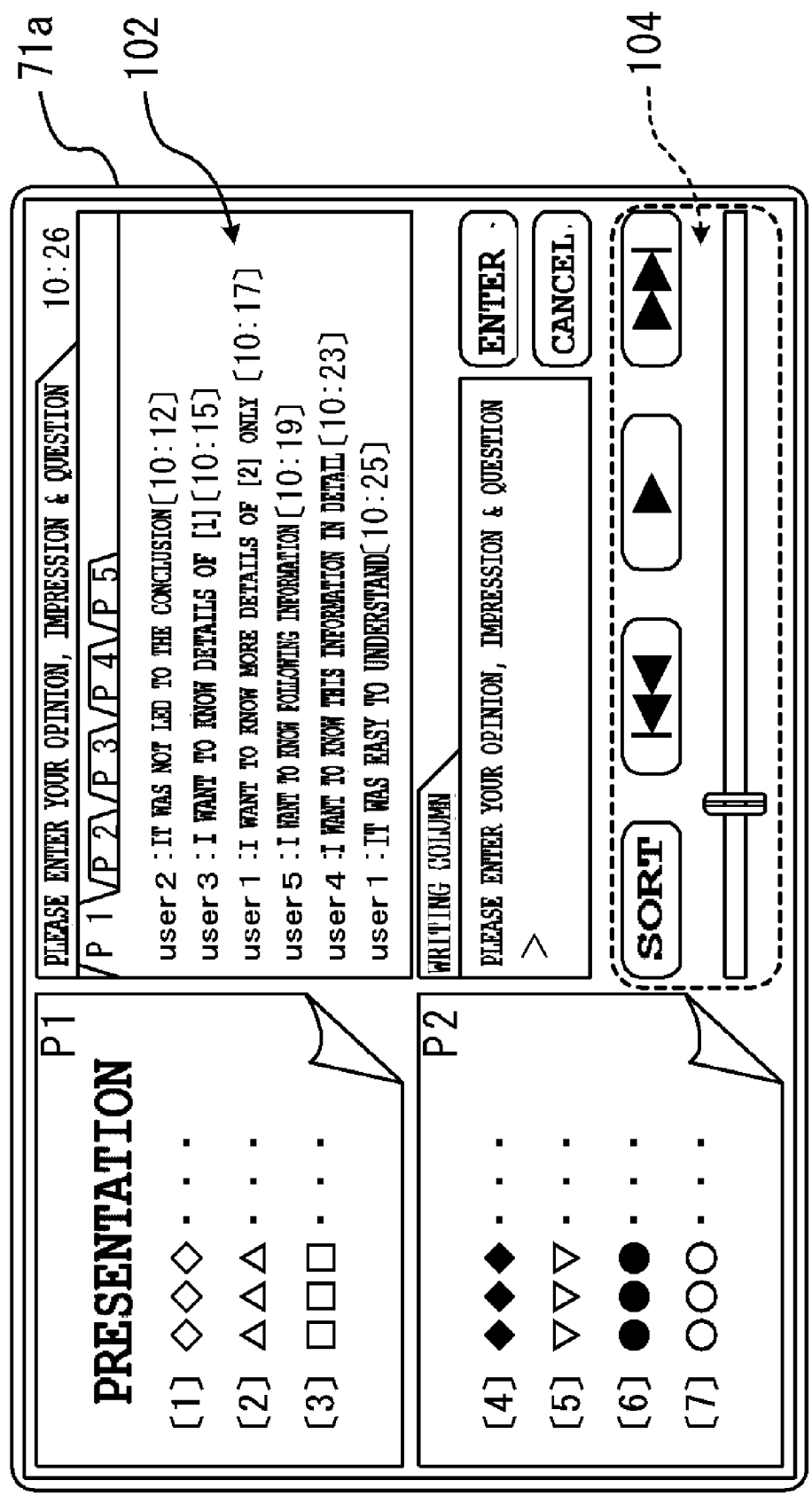
FIG. 10A is a screen diagram on the video monitor 71a which is related to a third feature (organization by write time instant) of the present disclosure.
Figure 10C:
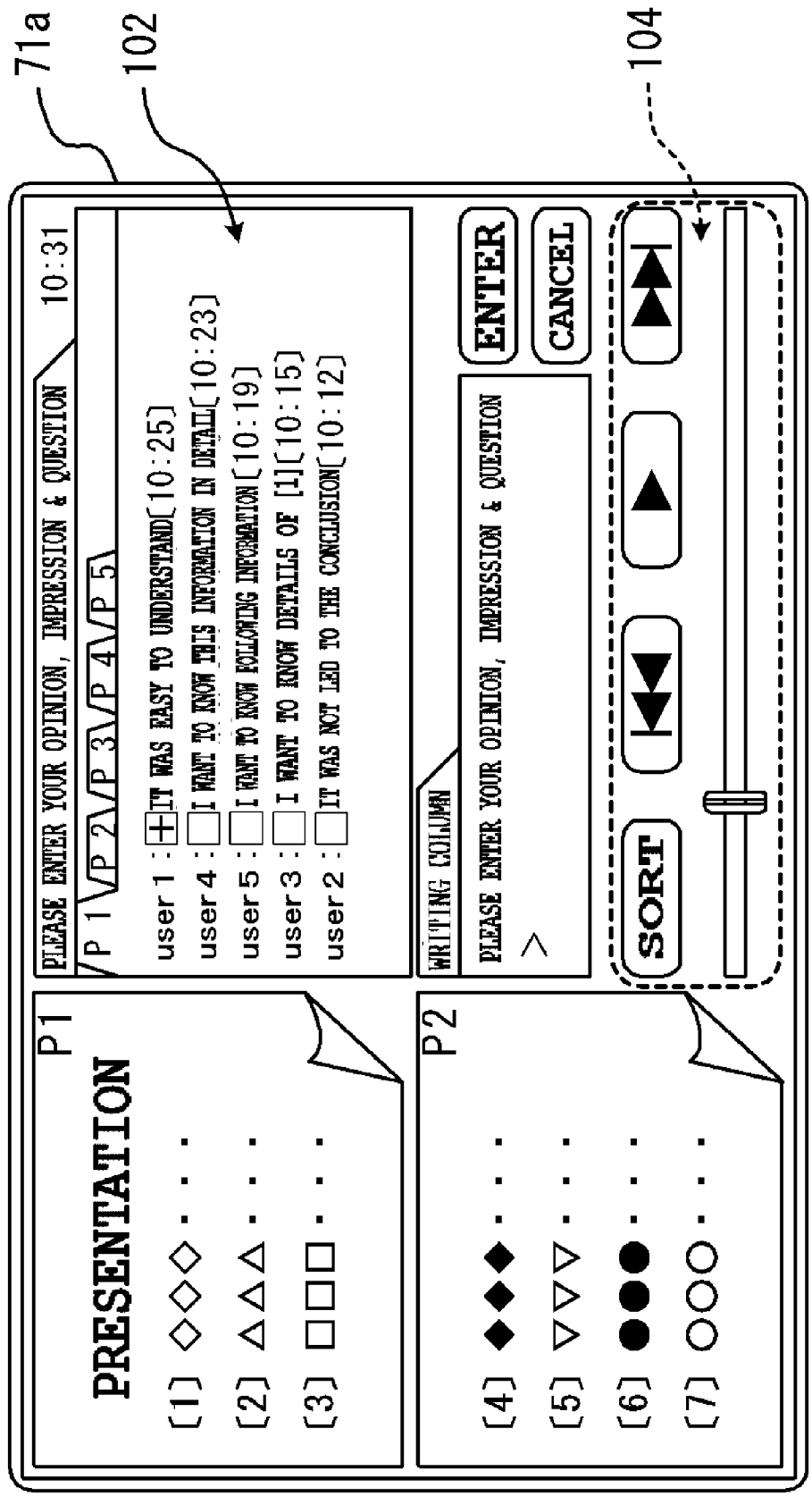
FIG. 10C is a screen diagram on the video monitor 71a which is related to the third feature of the present disclosure.

In FIG. 10A, FIG. 10B, and FIG. 10C, there is illustrated an another example for organizing (sorting) the character string, the terminal ID, and the time instant that are stored in the memory part 12 (FIG. 10A is identical with FIG. 9A in content).

In the example illustrated in FIG. 10A, FIG. 10B, and FIG. 10C, when the "SORT" button on the operation panel area 104 is manipulated, a plurality of writings from the same mobile terminal 73 are summarized into consecutive lines such that the latest writing takes the uppermost line and the writings are sorted by the time instant in descending order (in the order from the newest writing) from the top.

Regarding the folding and spreading of the character string that is entered from the mobile terminal with the same terminal ID in FIG. 10B and FIG. 10C, implementing these operations are allowed by manipulating the portion [−] or [+] on the bulletin board area 102, similar to the description using FIG. 9B and FIG. 9C.

(Fourth Feature)

Figure 11A:
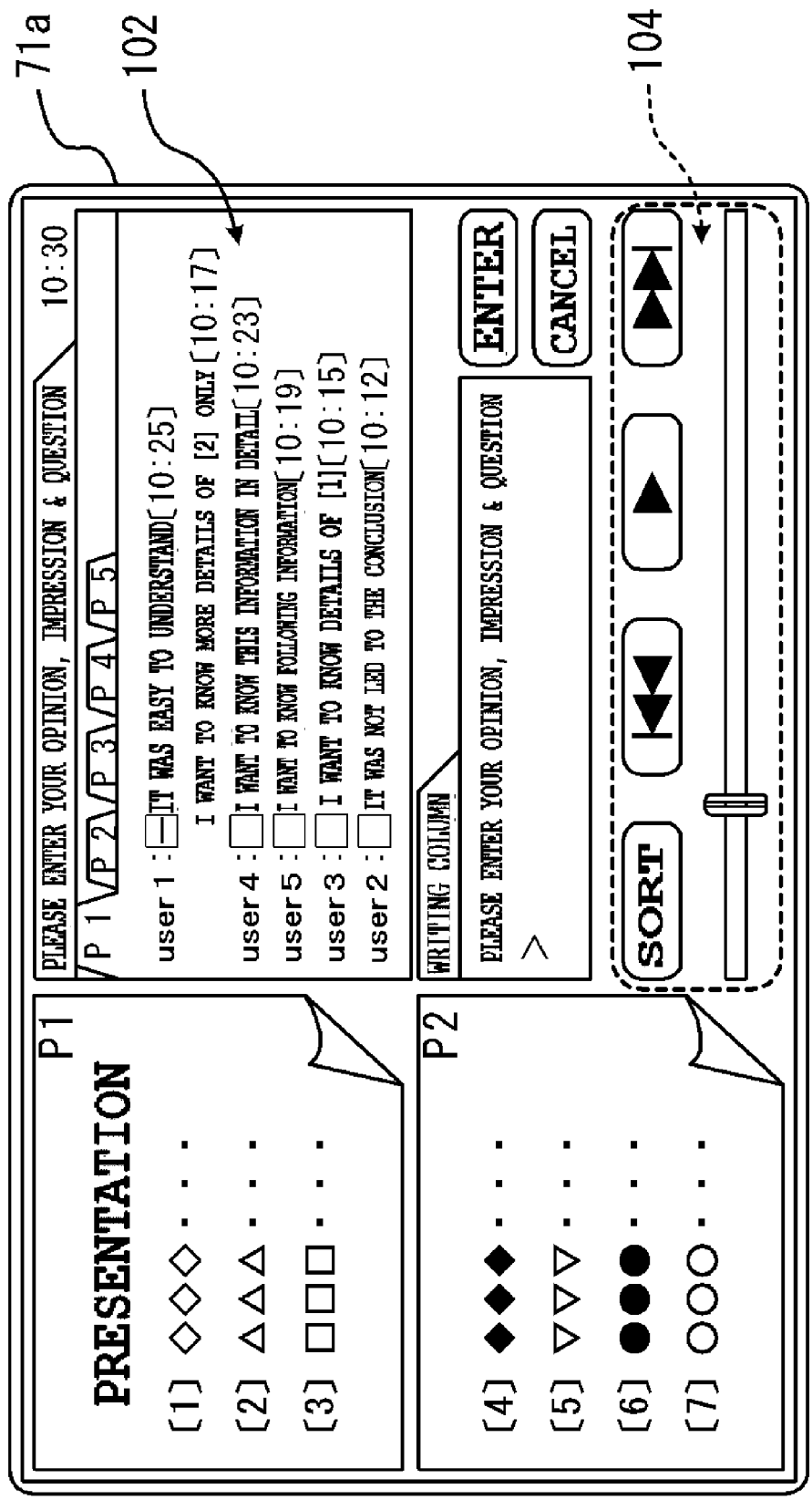
FIG. 11A is a screen diagram on the video monitor 71a which is related to a fourth feature (preceding writing) of the present disclosure.
Figure 11B:
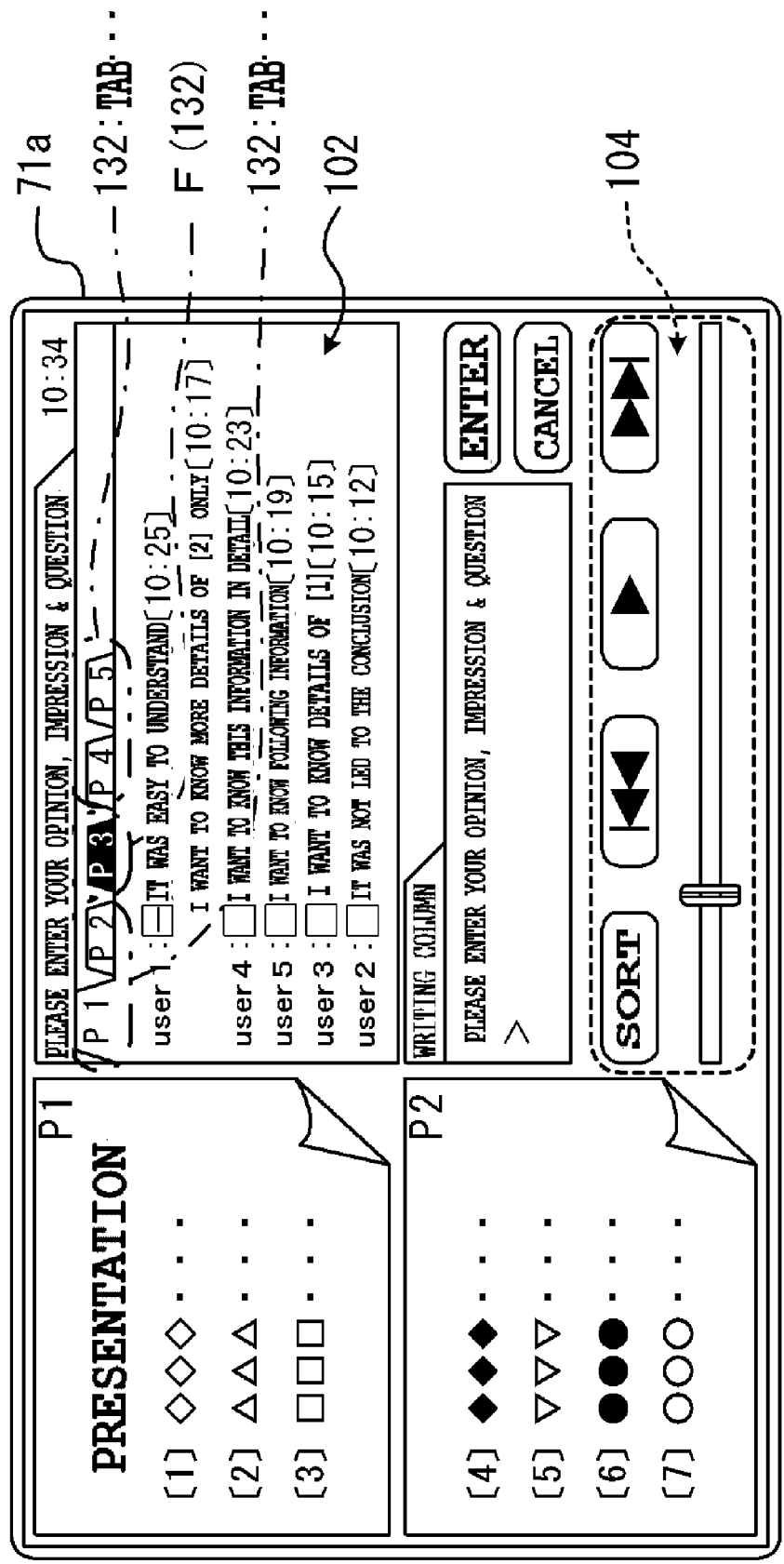
FIG. 11B is a screen diagram on the video monitor 71a which is related to the fourth feature of the present disclosure.
Figure 11C:
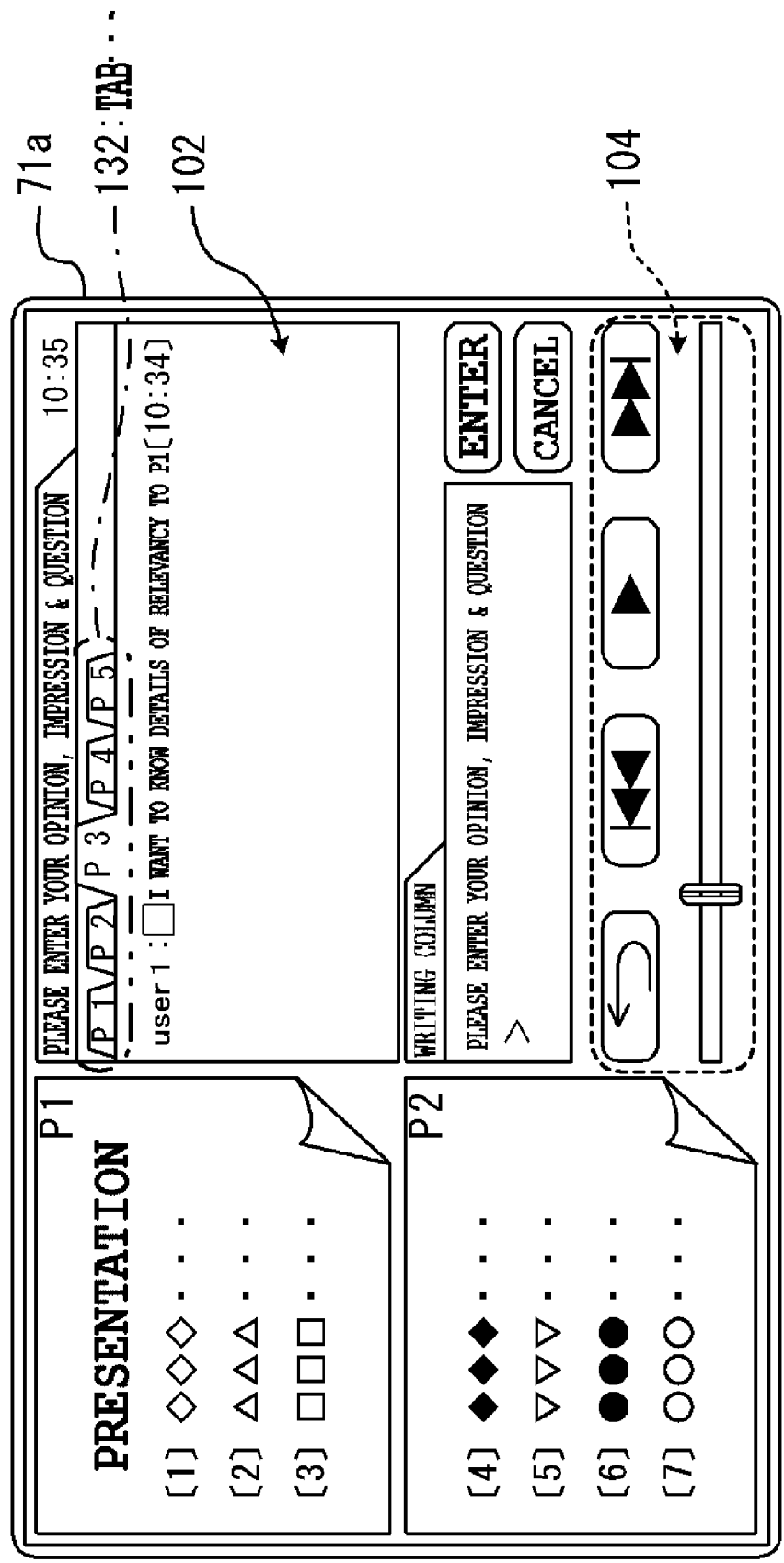
FIG. 11C is a screen diagram on the video monitor 71a which is related to the fourth feature of the present disclosure.

Incidentally, in a presentation, a conference, and the like to which the present exemplary embodiment is applied, it is usual that a presentation material is distributed to the audiences 83 in advance. In such cases, sometimes, before the presenter (s) 81 refers (refer) to a specific page number of the presentation material while the presentation is going on, the audience (s) 83 has (have) an opinion and/or question (opinions and/or questions) on a content of the specific number of the presentation material. FIG. 11A, FIG. 11B, and FIG. 11C illustrate that the present exemplary embodiment is capable of coping with such cases.

In FIG. 11A, the presenter (s) 81 refers (refer) to the writings on the video monitor 71a which include the answers, the opinions, the impressions, the questions, and the like that are linked to the page number "1" of the presentation material.

In addition, similar to the illustration of FIG. 10B, the bulletin board area 102 being displayed on the video monitor 71a indicates that a plurality of writings from the same mobile terminal 73 are summarized into consecutive lines such that the latest writing takes the uppermost line and the writings are sorted by the time instant in descending order from the top. It is to be noted here that the latest write time instant is [10:25]

At this time, as illustrated in FIG. 11B, one of the non-selected tabs 132 i.e., the tab indicated by "P3" changes its color tone compared to the other tabs as apparent from the indication by the code F (second page indication part).

On the bulletin board 102 of the present exemplary embodiment, when a most new writing is found (or a new writing is made) on a page whose page number is different from the currently selected page number, the color tone of the tab that corresponds to the page on which the most new writing is made to change.

Besides, how to add a character string on each of page that correspond to the tab "P3" is implemented, similar to the aforementioned procedure described with reference to FIG. 6, by selecting the tab "P3" in a touch screen manner to performing operations similar to those illustrated in FIG. B and FIG. 6.

The presenter (s) 81, who finds (find) that a color tone changes at a tab other than the tab of the currently selected page number, manipulates the color tone changed tab (the tab "P3") using the pointing device or the touch screen panel.

Thus, on the bulletin board area 102 of the video monitor 71a, the writings associated to the page number P3 of the presentation material and including the answer (s), opinion (s), impression (s), question (s), and the like are displayed.

In addition, the latest write time instant is [10:34] that is displayed on the bulletin board area 102 shown in FIG. 11C. This write time instant is later than the time when the latest writing is made on the bulletin board area 102 that is illustrated on FIG. 11A and FIG. 11B.

Thus obtained various kinds of information during the presentation or conference which include the answer (s), opinion (s), impression (s) and the like not only to serve to confirm the degree of comprehension (s) of the audience (s) but also to be incorporated often into a presentation material for the quality improvement of the next presentation or conference.

In that matter, the present exemplary embodiment allows for the successive collection of the various kinds of information from the audience (s) 83, which makes it possible to amend the contents of the presentation or conference, to adjust the speed of progress, and to exchange an order of presentation matter or question-and-answer according to the degrees of the understanding of the audiences 83, the matter in which the audiences 83 have interest, or the like.

However, due to the limited space of the bulletin board area 102 per se (on which page switching and the like are essentially implemented), it may be difficult to grasp the overall trends of the audiences 83.

(Fifth Feature)

In the present exemplary embodiment, it is possible to accumulate a presentation material, to acquire and accumulate various pieces of information, to organize these pieces of information that are linked to each page of the presentation material, and to output these pieces of information to paper surfaces by the printing part 19 of the MFP 1 as well as to output these pieces of information in the form of images that are projected by the MFP 1.

For example, the video monitor 71a that is shown in FIG. 12A displays the page number "P1" (and the page number "P2") of the presentation material, while the bulletin board area 102 displays the opinion, impression, question, and the like that are linked to the page number "P1".

At this stage, the control part 11 of the MFP 1 changes one of the icons on the operation panel area 104 to an "OUTPUT" button.

Then, if the presenter (s) manipulates (manipulate) the "OUTPUT" button on the operation panel area 104 by using the pointing device or touch screen functionality, the information of the page whose tab (132) is selected on the bulletin board area 102 and the page of the presentation material which is linked by the preceding page are printed in pair in a sequential manner or printed concurrently in one paper.

Figure 12B:
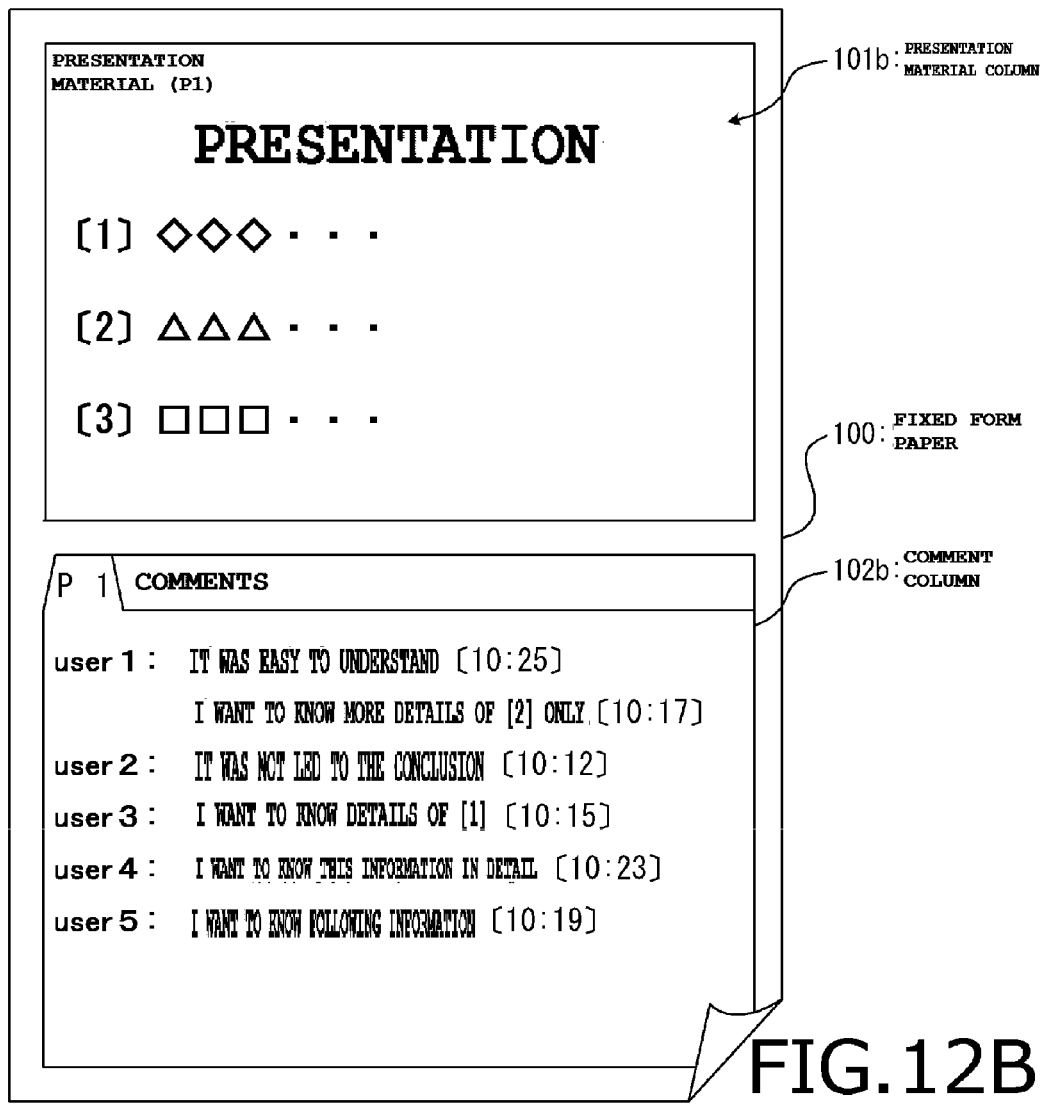
FIG. 12B is an illustration that is indicative of a situation of a fixed form paper 100.

FIG. 12B illustrates a printing example wherein the liked two pages are allocated on one fixed form paper 100. The image shown in FIG. 12B is made up of a presentation material column 101*b* (first information pieces) and a comment column 102*b* (second information pieces).

The presentation material column 101*b* is a modified version of the presentation material column 101*a* shown in FIG. 5 by adding index "PRESENTATION MATERIAL" or the like. In addition, the comment column 102*b* is a modified version of the bulletin board area 102 shown in FIG. 12A by adding notations "COMMENTS" and more.

Besides, it is possible to provide different colors to recognize the comments of the different terminal IDs and to establish a transfer, in the form of electronic output instead of paper, from the MFP 1 to another computer terminal, tablet terminal, MFP, or the like.

As detailed above, according to the present exemplary embodiment, in addition to the preliminary recording of the presentation material on the memory part 12, it is possible to accept, via the mobile terminal (s) 73, the proposal of the comment or the like (the answer, opinion, impression, or question to the questionnaire) immediately when each of the audience 83 comes to have an instant idea of the answer, opinion, impression, or question to the questionnaire during the presentation, and the proposal is accumulated on the memory part 12. Thereby, for the presenter (s) 81, it is possible to obtain beneficial information that is in line with the contents of the presentation.

In this case, for each page of the presentation material of the plural pages, the virtual bulletin board (the bulletin board area 102*a*) is prepared and the one or more mobile terminals 73 are allowed to display the bulletin of an arbitrary page in a selective manner. In addition, the string character including the comment entered into each of the one or more the mobile terminals 73 is accumulated on the memory part 12. Further, such the string character is also written on the bulletin board whose page number is displayed on the mobile terminal from which this character string is entered.

In addition, On the bulletin board area 102 that is formed on the operation terminal 71 to which the presenter (s) 81 refers (refer to), it is possible to display the bulletin board of an arbitrary page in a selective manner. The character string such as the entered comment is added with pieces of information that include the terminal ID whose terminal device is used to enter (write) the character string and the resulting character string is displayed.

Thus, the presenter (s) 81 is able to have an immediate grasp of the degrees of the understanding of the audiences 83, what question the audience (s) 83 has (have), or which kind of information the audience (s) 83 takes (take) interest. In addition, in a case where the collecting rate of the questionnaire seems to be low, it is possible for the presenter (s) 81 to transmit a message for urging the audiences 83 to submit a prompt proposal of the comment, which will make it possible to expect that the collecting rate and the number of proposals of the comment or the like will increase.

That is to say, as one of the features of the present disclosure, at first, the comments and the like that are accumulated on the memory part 12 are linked (associated) with the page numbers and the like of the presentation material that is the target of the comments and the like and the resulting comments and the like are memorized on the memory part 12. Thereby, it is possible to have an immediate recognition of which kinds of the comments are raised on what page of the presentation material.

Second, the comments or the like for being accumulated on the memory part 12 are added with the terminal IDs of the mobile terminals 73 that are to be used to write these comments or the like and the resulting comments or the like are recorded on the memory part 12. Thereby, it is possible to itemize these comments or the like for each the terminal ID and to sort these comments or the like by the terminal ID, the presenter 81 come (s) to have an easy grasp of, to say nothing of the content of the answer, opinion or impression to the questionnaire, the content of the question or the like, which mobile terminal 73 fails to answer to the questionnaire or which mobile terminal 73 raises an opinion, impression, question, answer to the questionnaire or the like in a positive manner.

Third, the comments or the like for being accumulated on the memory part 12 are added with the time instants when these comments or the like are written and the resulting comments or the like are recorded on the memory part 12. Thereby, it is possible to sort these comments or the like by the write time instant, the presenter 81 come (s) to refer to the latest comment or the like and also to have an easy grasp of when the audience (s) 83 raises (raise) which kinds of comments or the like.

In addition, in light of the page number of the presentation material or the write time instant that are linked to the comment or the like that is to be accumulated on the memory part 12, when it is found that the page number of the comment or the like to which the presenter (s) 81 refers (refer) is different from the page number that is being under presentation, the operation terminal 71 notifies to the presenter (s) 81 to the effect.

Thus, fourth, a similar remedy can be obtained if the audience (s) 83 raises (raise) an opinion or a question regarding a page number that succeeds the page number of the presentation material which is being under presentation, when paper-based presentation materials are distributed respectively to the audiences 83 in advance, the present exemplary embodiment is capable of coping with such cases.

Fifth, a specific page number of the presentation material and a comment or the like that is linked to the specific page number constitute one information combination or set.

This information combination or set is to be printed out from the printing part 19 or is to be outputted as digitalized information. Thus prepared information is available as minutes in a conference, for example.

It is also possible to grasp in a correct manner the whole situation of the audiences 83 and therefore to establish a successive amendment of the content or item during a presentation or a reporting in a conference or the like, or an immediate change of the order of presentation, thereby improving the quality of the presentation or the conference.

It is to be noted the present disclosure is not limited to the aforementioned exemplary embodiments and therefore variations of the exemplary embodiments fall well within the spirit and scope of the disclosure.

For example, it is possible to provide, at a head or tail portion of each line of a comment or the like in the bulletin board 102 shown in, for example, FIG. 3 and FIG. 7, a check area that is adapted to be added with a check mark for indicating that such a comment or the like has been read. In such a case, a read flag area is provided at a part of each line on the audience writing area of the memory part 12 shown in FIG. 8.

Figure 13A:
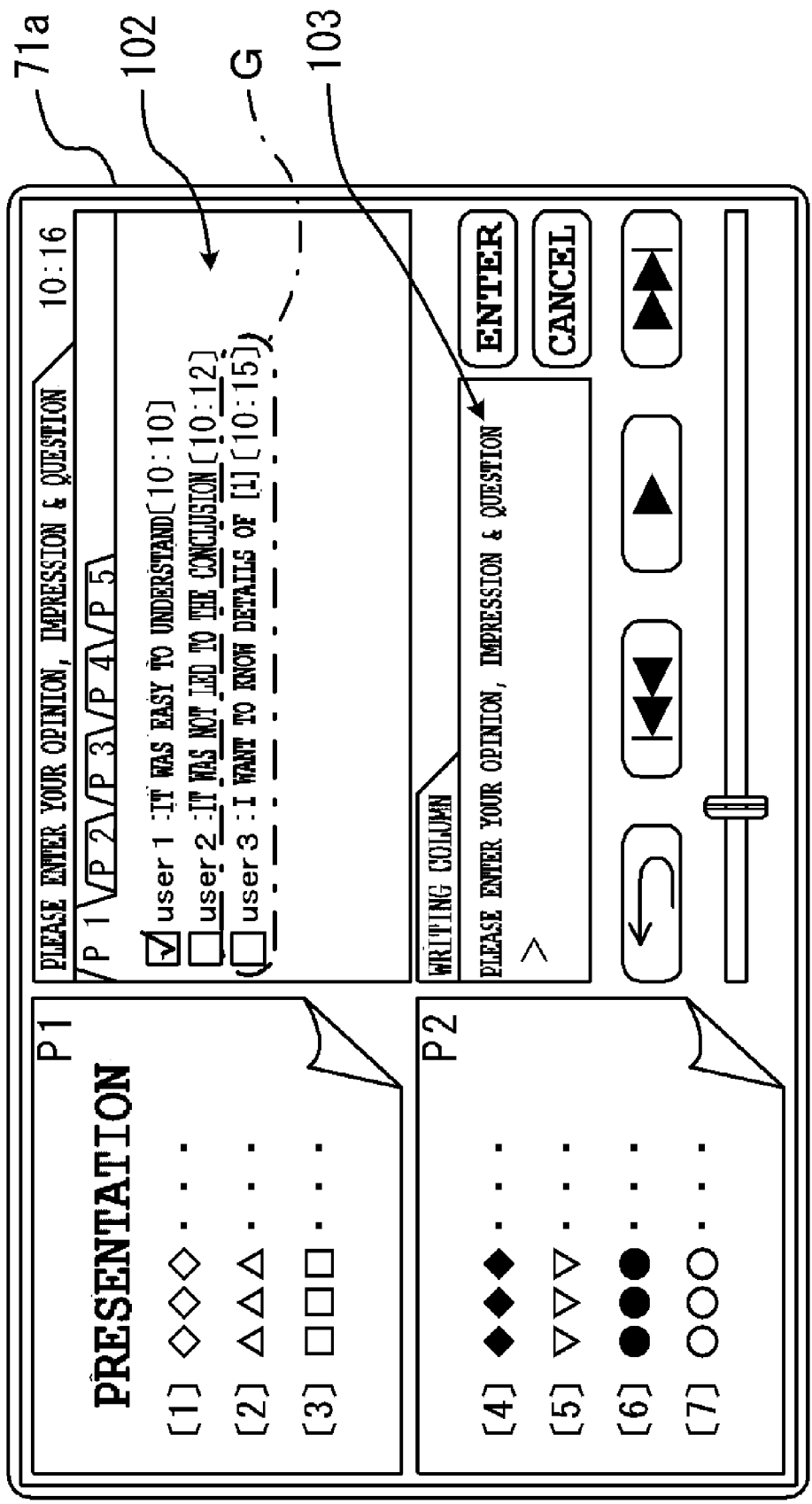
FIG. 13A is a screen diagram on the video monitor 71a which is related to another exemplary embodiment of the present disclosure.
Figure 13B:
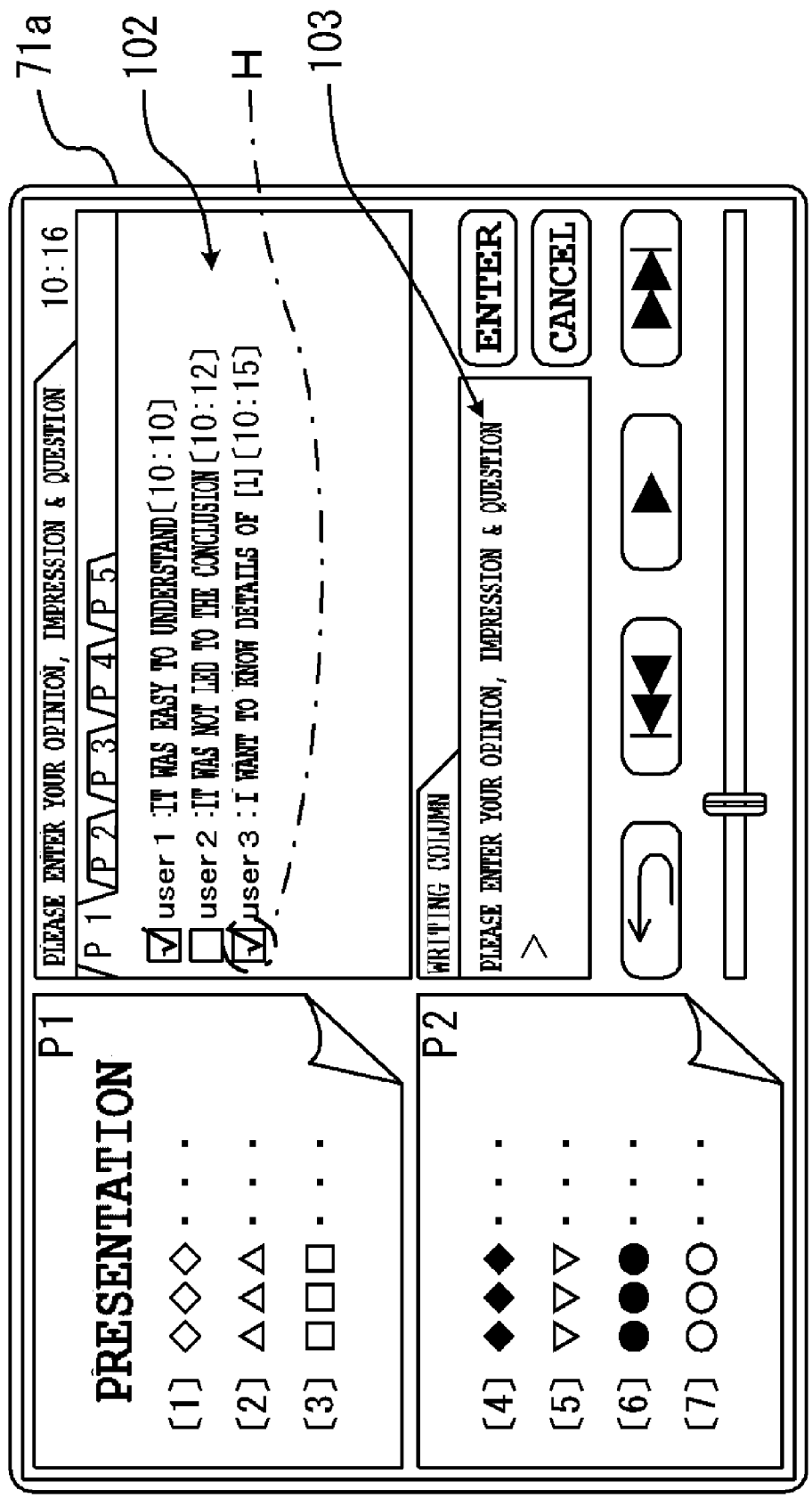
FIG. 13B is a screen diagram on the video monitor 71a which is related to the another exemplary embodiment of the present disclosure.

Referring to FIG. 13A, there is added a comment or the like as indicated by the code "G" on the bulletin board area 102. The presenter (s), after reading this comment or the like, manipulates the keyboard, pointing device, or the touch screen to make or assign a check mark on the check area of such a line. This manipulation sets an already read flag in a data set on the memory part 12 which is in association with the comment or the like that is assigned with the check mark (not shown).

Figure 13C:
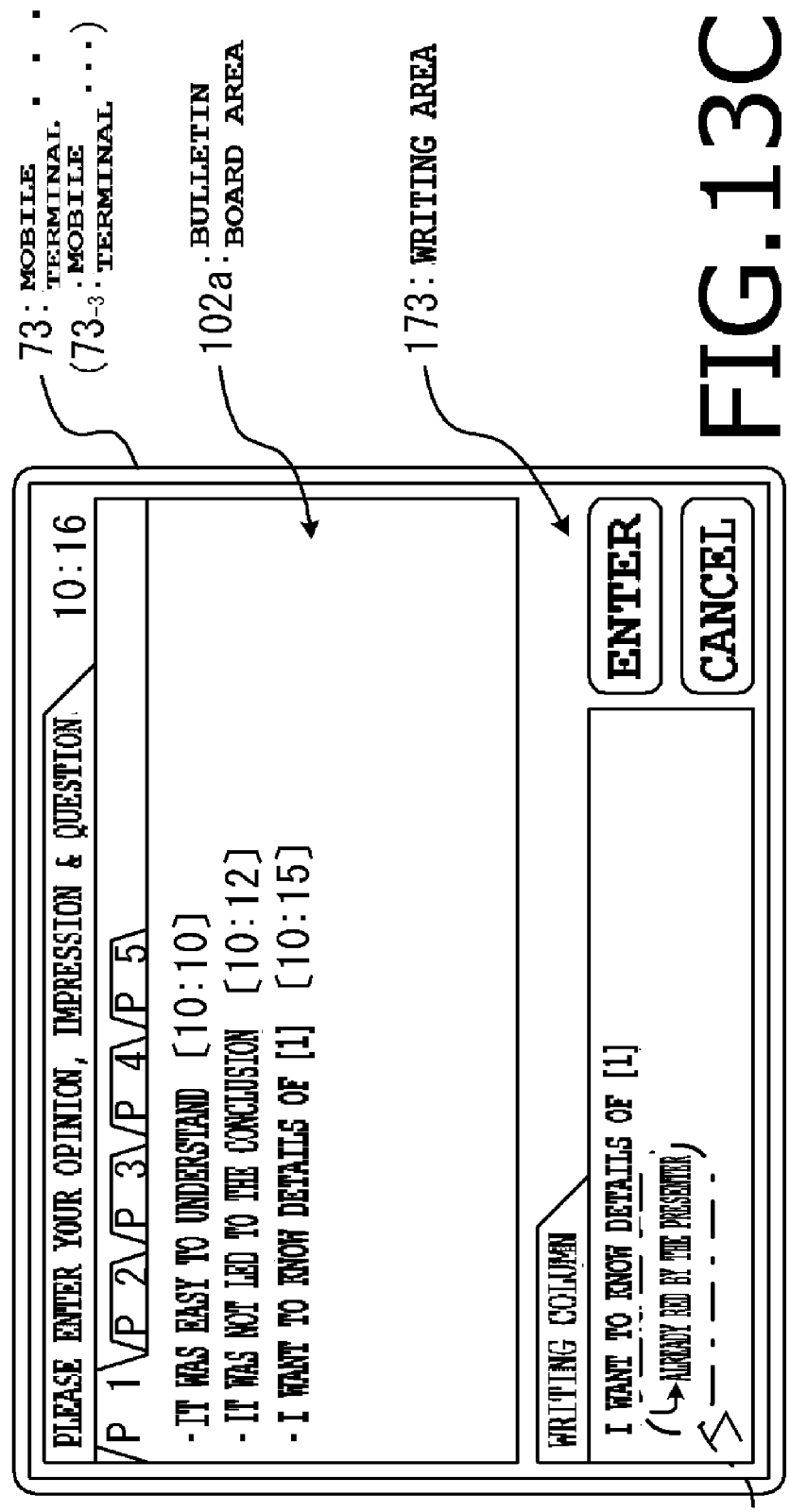
FIG. 13C is a screen diagram on the mobile terminal 73-3 which is related to the another exemplary embodiment of the present disclosure.

Simultaneously, as indicated by the code "I" in FIG. 13C, a message or the like that says "I HAVE READ YOUR COMMENT OR THE LIKE" is added to the writing column 173 of the mobile terminal 73 from which the comment or the like is written.

Thus, it is possible to expect that the response rate and the number of the raised comments or the like increases.

Furthermore, it is possible to grasp, during presentation, whether or not the number of the written comments increase or not depending on whether the already read messages have been responded or not, which allows for one of criteria that are to be employed as to how the currently implemented presentation should be amended. This is also one of the features that the present disclosure provides.

Alternatively, the comments or the like written by the audiences 83 may be classified into previously expected classes or categories. Each of FIG. 14A, FIG. 14B, and FIG. 14C illustrates an example image that appears on one of the mobile terminals 73 (the mobile terminal 73-1) or the operation terminal 71 (the video monitor 71a) in a case where each of the audiences 83 are allowed to select one of the categories as to the comments or the like that each of the audiences 83 is going to write.

Figure 14A:
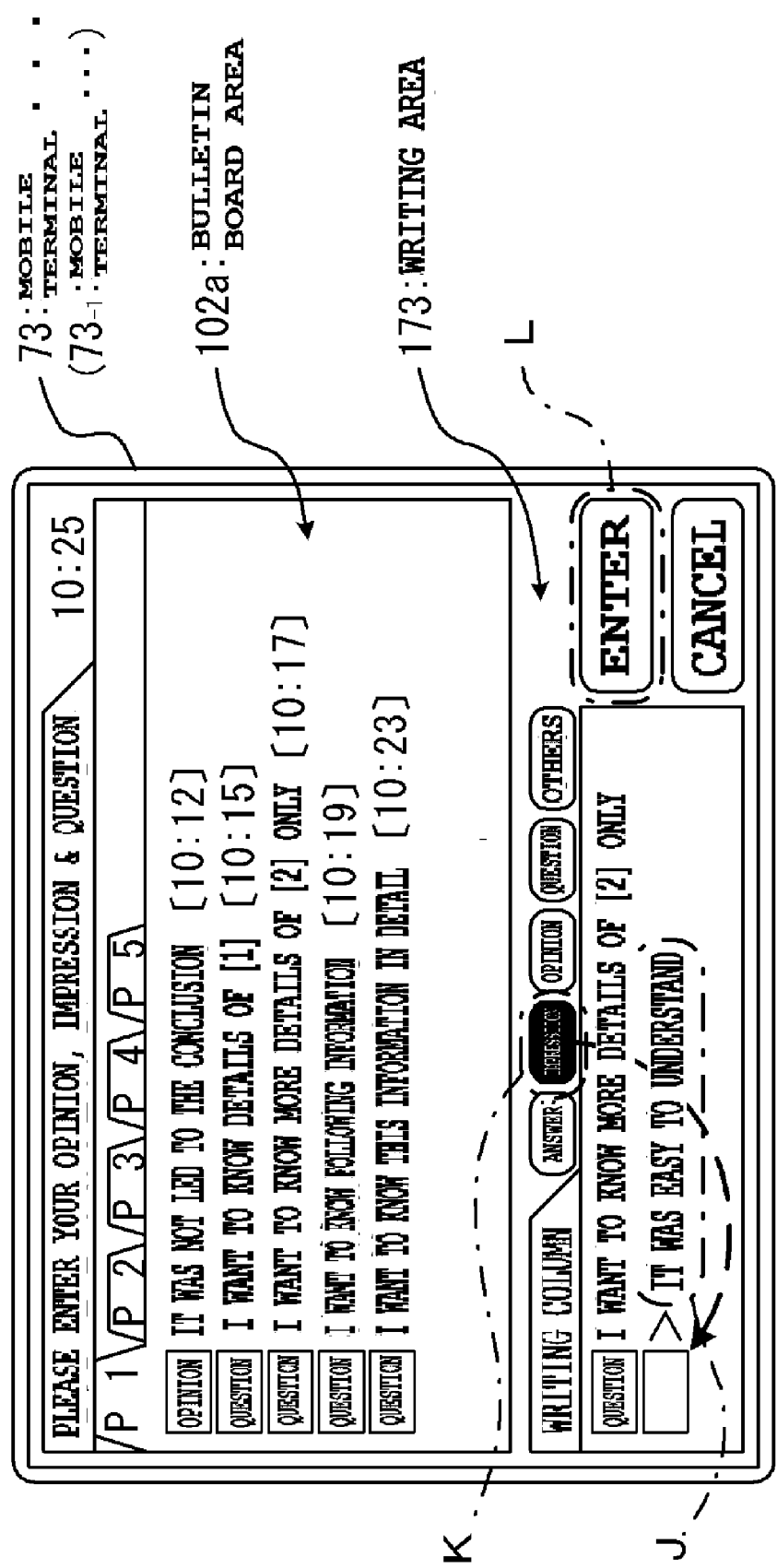
FIG. 14A is a screen diagram on the mobile terminal 73-1 which is related to a further exemplary embodiment of the present disclosure.
Figure 14B:
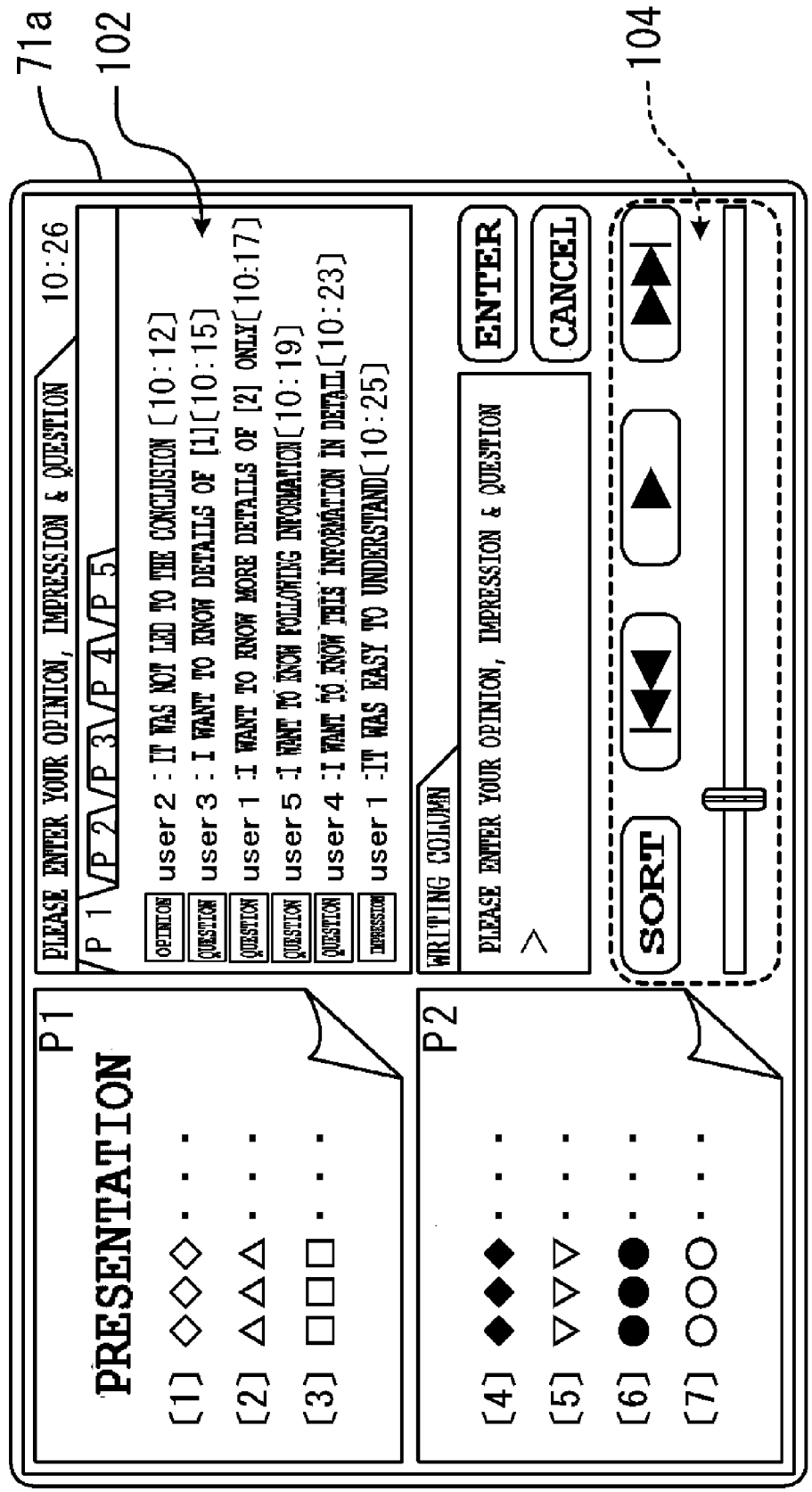
FIG. 14B is a screen diagram on the video monitor 71a which is related to the further exemplary embodiment of the present disclosure.
Figure 14C:
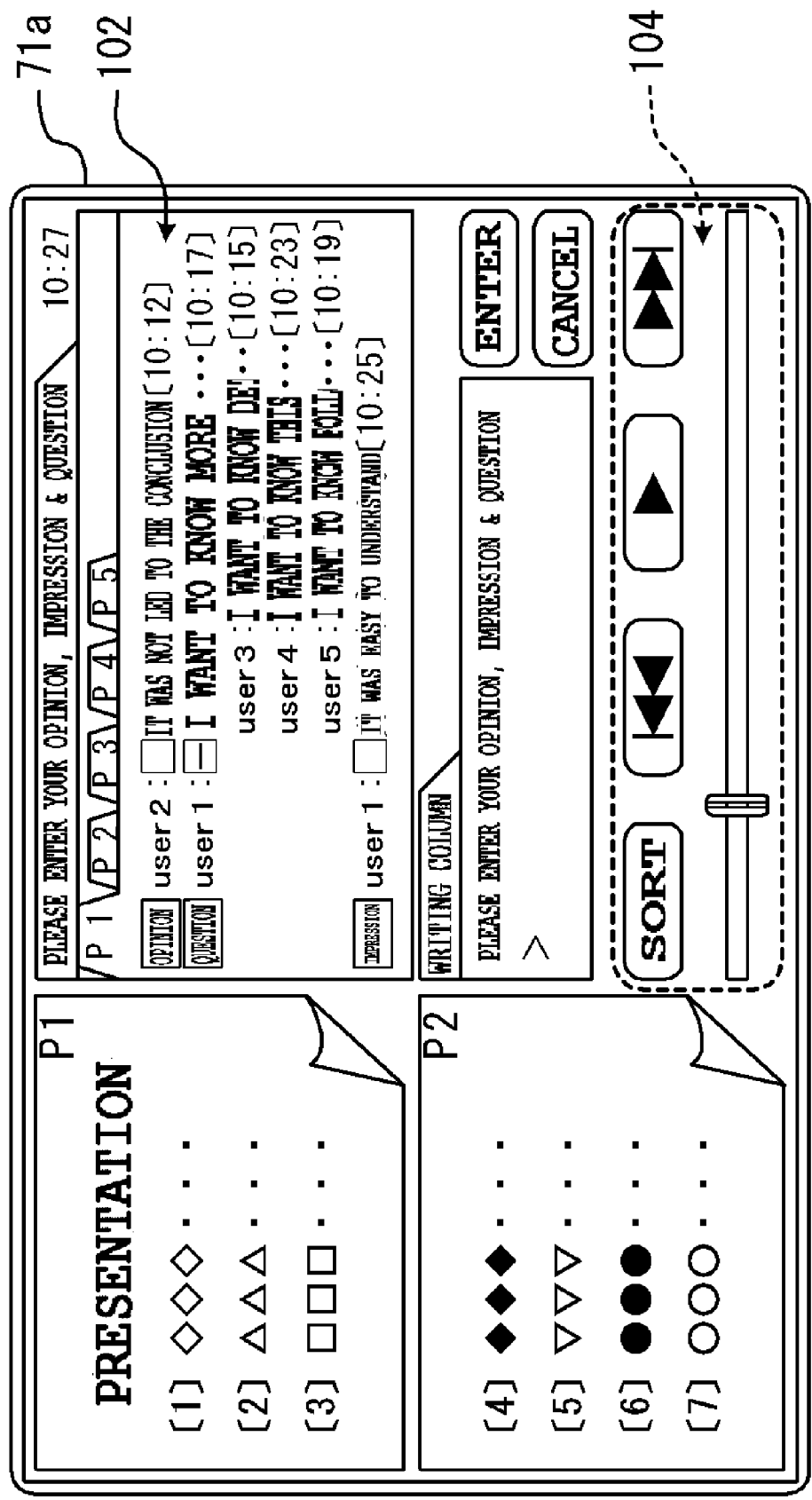
FIG. 14C is a screen diagram on the video monitor 71a which is related to the further exemplary embodiment of the present disclosure.

Referring to FIG. 14A, at the head of each of the lines that are displayed on the bulletin board area 102a of the mobile terminal 73-1, [OPINION], [QUESTION], or the like appears. In addition, on the upper part of the writing column 173, there is provided a button display (GUI) that includes {ANSWER}, {IMORESSION}, {OPINION}, {QUESTION}, and {OTHER} (It is to be noted that the character bracketed by right and left curly bracket means a character that is enclosed by a corner rounded frame.) In addition, at the head of each line on the writing area 173, there is displaced [QUESTION] or the like that is enclosed by a rectangular frame.

The [OPINION], [QUESTION], and the like that are displays on the bulletin board 102a are indicative of the categories of the written comments or the like. In this illustrated example, these categories are to be selected by the audiences 83 who operate the mobile terminal 73, respectively.

That is to say, on the writing column 173 of the mobile terminal 73-1, the audience 83-1 enters "IT WAS EASY TO UNDERSTAND" (a character string J) as indicated by the symbol "J" and then manipulates the button indication part {IMPRESSION} as indicated by the symbol "K".

Thereafter, the audience 83-1 manipulates the "ENTER" button indication part as indicated by the symbol "L" to enter the character string J. It is to be noted that the dotted line arrow means that a unit of the characters of "IMPRESSION" that are manipulated as indicated by the symbol "K" is subject to copy.

Thus, the character string that are indicative of the comment or the like and that is caused to fall in the category of "IMPRESSION" is entered, which results in that the video monitor 71a comes to display as illustrated in FIG. 14B.

Sometimes, how to reflect the comment or the like entered in such a manner on the presentation or its material may vary with a category into which the entered comment or the like falls.

In light of this, this illustrated example is also made possible to sort the entered comments or the like by category as indicated in FIG. 14C.

How to implement or perform this sorting will not be detailed here due to its similarity to the sorting procedures that are detailed in the aforementioned descriptions associated with the (second feature) and the (third feature).

Furthermore, in this example, it is also possible, after performing the sorting as illustrated in FIG. 14C, to output (print out) the result of this sorting similar to the output (printing out) mode that is described in the (fifth feature).

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. An information processing device comprising:
  a memory part that memorizes various kinds of information including a presentation material, the presentation material being formed of a plurality of page numbers and being to be presented from one or more presenters to one or more audiences, and a plurality of information combinations;
  a control part that reads out the various kinds of information including the presentation material from the memory part and writes the various kinds of information onto the memory part; and
  a timer part that is provided by the control part and outputs time instant information,
  the information processing device being connected with a first information terminal and one or more second information terminals,
  the first information terminal outputting the various kinds of information including the presentation material and being inputted with a character string information item and an operation instruction from the one or more presenters,
  the one or more second information terminals being assigned with individual unique identification numbers, outputting the various kinds information, and being inputted with character string information items and operation instructions from the one or more audiences, wherein
  the first information terminal provides a presentation material area on which one or more pages of the presentation material, that is read out from the memory part, are displayed,
  the first information terminal provides a bulletin board area on which one or more tabs that indicate page numbers of the presentation material and an information combination, of the plurality of information combinations, read out from the memory part are displayed,
  the first information terminal provides a writing column on which a character string being currently entered on the first information terminal and a transmission history of character strings entered on the first information terminal are displayed, the presentation material area, the bulletin board area, and the writing column are displayed on the same display screen, the one or more second information terminals each provide a bulletin board area on which one or more tabs that indicate page numbers of the presentation material and an information combination, of the plurality of information combinations, read out from the memory part are displayed, the one or more second information terminals each provide a writing column on which a character string being currently entered on the respective second information terminal and a transmission history of character strings entered on the respective second information terminal are displayed, the bulletin board area of the one or more second information terminals and the writing column of the one or more second information terminals are displayed on the same display screen of the respective second information terminal, the control part causes each of the one or more second information terminals to, upon selecting a tab, read out an information combination, of the plurality of information combinations, corresponding to the page number that the tab being selected by the each one or more second information terminals indicates, the control part causes the each one or more second information terminals to display the corresponding information combination on the bulletin board area of the each one or more second information terminals, and records additionally an information combination corresponding to the page number that the tab selected by the each one or more second information terminals indicates on the memory part, as one of the plurality of information combinations, when a character string is entered in the writing column of the each one or more second information terminals and a writing button is manipulated on an operation panel area of the each one or more second information terminals, the plurality of information combinations are each formed of a character string entered on the writing column of a second information terminal of the one or more second information terminals, the time instant information of the character string entered on the second information terminal, and the terminal identification number assigned to the second information terminal, the control part causes the first information terminal to read out an information combination, of the plurality of information combinations, corresponding to the page number that a tab being selected by the first information terminal indicates from the memory part and to display the corresponding information combination, read out by the first information terminal, on the bulletin board area of the first information terminal, the control part causes the first information terminal to additionally record, in the memory part, an information combination corresponding to the page number that the tab being selected by the first information terminal indicates when a character string is entered on the writing column of the first information terminal and an enter button is manipulated on the display screen of the first information terminal, the information combination additionally recorded by the first information terminal is formed of the character string entered on the writing column when the enter button is manipulated on the display screen of the first information terminal, the control part causes the first information terminal to summarize a plurality of character strings from the one or more second information terminals and display the summarized plurality of character strings on the bulletin board area of the first information terminal into consecutive lines such that the latest character string of the plurality of character strings takes the uppermost line when a sort button is manipulated on the display screen of the first information terminal, the control part causes the first information terminal to display all the character strings entered from the same one or more second information terminals in consecutive lines on the bulletin board area when a spread button is manipulated on the display screen of the first information terminal, and the control part causes the first information terminal to conceal the character strings displayed on the bulletin board area other than the latest character string from the same one or more second information terminals when a conceal button is manipulated on the display screen of the first information terminal.

2. The information processing device according the claim 1 further comprising a printing part that prints out the various kinds of information including the presentation material, wherein the control part causes the printing part to print out a first information group that is an arbitrary page number of such the presentation material and a second information group constituted by all the information combinations to which such the page number is added that is recorded on the audience writing area, as one unit.

* * * * *